(12) United States Patent
Davis

(10) Patent No.: US 11,940,278 B2
(45) Date of Patent: Mar. 26, 2024

(54) VARIABLE RANGE ESTIMATION FOR A MARINE VESSEL

(71) Applicant: NAVICO, INC., Tulsa, OK (US)

(72) Inventor: Alan P. Davis, Winchester (GB)

(73) Assignee: Navico, Inc., Tulsa, OK (US)

( * ) Notice: Subject to any disclaimer, the term of this patent is extended or adjusted under 35 U.S.C. 154(b) by 0 days.

(21) Appl. No.: 17/682,437

(22) Filed: Feb. 28, 2022

(65) Prior Publication Data

US 2023/0273026 A1 Aug. 31, 2023

(51) Int. Cl.
*B63B 79/15* (2020.01)
*B63B 49/00* (2006.01)
*G01C 21/20* (2006.01)
*B63B 79/00* (2020.01)

(52) U.S. Cl.
CPC ............ *G01C 21/203* (2013.01); *B63B 49/00* (2013.01); *B63B 79/00* (2020.01); *B63B 2201/02* (2013.01); *G01C 21/20* (2013.01)

(58) Field of Classification Search
CPC ..... B63B 2213/00; B63B 79/00; B63B 79/30; B63B 79/15; B63B 79/40; B63B 49/00; G01C 21/203; G01C 21/20
USPC .......................................................... 318/108
See application file for complete search history.

(56) References Cited

U.S. PATENT DOCUMENTS 7,268,703 B1 9/2007 Kabel et al.
8,594,918 B2 * 11/2013 Meyer-Ebeling ... B60L 15/2045
701/123
9,969,275 B2 * 5/2018 Heyse ................ G01C 21/3469
10,328,814 B2 * 6/2019 Miller ....................... B60L 1/02
10,393,529 B2 8/2019 Steward
11,584,396 B2 * 2/2023 Cussigh ............. B60W 50/082
(Continued)

FOREIGN PATENT DOCUMENTS

DE 102011116115 A1 * 4/2013 ........... B60W 20/12
DE 102015015982 A1 * 6/2016 ........... B60W 40/09
WO WO 2020/206380 A1 10/2020

OTHER PUBLICATIONS

SimRad—TripIntelTM—Application note Feature Usage, p. 1-18 (from applicant's IDS Apr. 19, 2022) (Year: 2017).*

(Continued)

*Primary Examiner* — Cuong H Nguyen
(74) *Attorney, Agent, or Firm* — Nelson Mullins Riley & Scarborough LLP

(57) ABSTRACT

Systems and methods for indicating a navigable area that is reachable by a watercraft with a current amount of energy is provided. The system comprises a display, a processor and a memory, including a computer code configured to, when executed by the processor, cause the system to receive position data indicating a current geographic location of a watercraft; receive tidal data for the current geographic location of the watercraft; determine, based on energy remaining data, an estimated available travel distance for operating a motor of the watercraft before the watercraft runs out of energy; and generate an overlay for a chart. The overlay comprises a boundary area corresponding to the estimated available travel distance and the effect of the tide on the watercraft. The computer code further presents the overlay on the chart to visually indicate travel options from the current geographic location.

19 Claims, 16 Drawing Sheets

(56) References Cited

U.S. PATENT DOCUMENTS

| | | | |
|---|---|---|---|
| 2014/0074329 A1* | 3/2014 | Yang | B60L 58/12 903/930 |
| 2014/0200806 A1 | 7/2014 | Carnevali | |
| 2015/0142305 A1 | 5/2015 | Kubo | |
| 2017/0365175 A1* | 12/2017 | Harnett | B63H 20/14 |
| 2019/0011266 A1* | 1/2019 | Steward | B63B 79/30 |

OTHER PUBLICATIONS

M. J. Zimmerman and H. Henley, "Applications of today's 3D forward looking sonar for real-time navigation and bathymetric survey," Oceans 2017—Anchorage, Anchorage, AK, USA, 2017, pp. 1-7. (Year: 2017).*

B. C. Shah and S. K. Gupta, "Long-Distance Path Planning for Unmanned Surface Vehicles in Complex Marine Environment," in IEEE Journal of Oceanic Engineering, vol. 45, No. 3, pp. 813-830, Jul. 2020, doi: 10.1109/JOE.2019.2909508. (Year: 2020).*

Thai, Zhong W., et al., An abstract of "Study of swarm-based planetary exploration architectures using agent-based modeling." AIAA Scitech 2020 Forum. (Year: 2020.).*

Simrad—TripIntel "Application note", retrieved from <https://www.simrad-yachting.com/Root/Simrad-Documents/TripIntel_Application-Note.pdf>, Date Accessed: Aug. 17, 2017.

Simrad: Simrad E50xx ECDIS system; retrieved from <http://www.navico-commercial.com/en-US/Receommended-Products/Patrol-Vessels/ECDIS/E5024-ECDIS-system-en-us.aspx>, Date Accessed: Aug. 17, 2017.

Martek Marine Innovative Ship Solutions: "A Guide to Electronic Charts Finding the Best Licensing Solution for your Ships" retrieved from <http://www.ecdis-info.com/media/Guides/iecdis-enc-guide.pdf>> Date Accessed: Aug. 17, 2017.

"Simrad TripIntel Overview;" Simrad Yachting; Sep. 22, 2016; retrieved from YouTube Apr. 12, 2022 from https://www.youtube.com/watch?v=U83TJEuLbvk.

* cited by examiner

VARIABLE RANGE ESTIMATION FOR A MARINE VESSEL

FIELD OF THE INVENTION

Embodiments of the present invention relate generally to navigating a marine environment, and more particularly, to providing boundary areas and routes based on current characteristics of a watercraft and a body of water.

BACKGROUND OF THE INVENTION

Navigational systems, such as marine navigational systems, may provide a display of a navigation chart or map. Nautical navigation charts including electronic or interactive nautical charts are typically used to provide a user with information about a body of water including (but not limited to) depth, routes, water temperatures, or the like. Some nautical charts may also provide an indication of the current location of a watercraft (e.g., vessel), such as the watercraft associated with the display device. Further, some electronic nautical charts may also display the location, course, speed and/or other information for one or more other watercrafts on the body of water.

Some electronic nautical charts display a graphical range representation, of how far a watercraft may travel in association with an amount of energy remaining within a propulsion system of the watercraft, however the representation may include land, shallow areas, and other unnavigable areas.

BRIEF SUMMARY OF THE INVENTION

As noted above, navigational systems are capable of collecting, compiling, and storing various data about marine navigation and marine events, and presenting graphical range representations. Current graphical range representations are equidistant in all directions from a watercraft, without accounting for land, natural variables, or other conditions which may make portions of the range unnavigable. By only indicating a single distance, as the maximum travel distance, and not factoring various things like unnavigable areas such as land, return trips, tides, currents, etc., the graphical representation may not convey useful data to the user.

Embodiments of the present invention enable determination and presentation of a boundary area based on information contained within navigational systems, including, for example, land locations, weather patterns, tidal data, start and end points, and other variables detailed herein.

Some embodiments of the present invention may take into account and/or determine desired speeds of the watercraft, turn capabilities, and/or additional user inputs to determine the navigation route. In some embodiments, the marine data system may suggest operating conditions to adjust navigable range and/or increase efficient operation of the watercraft.

In an example embodiment, a system for indicating a navigable area that is reachable on a current amount of energy for a watercraft is provided. The system comprises a display, a processor, and a memory including a computer code. The computer code is configured to, when executed by the processor, cause the system to receive position data indicating a current geographic location of the watercraft on a body of water and determine tidal data for the current geographic location of the watercraft indicating an effect of the tide on the watercraft. The computer code is further configured to cause the system to determine, based on energy remaining data corresponding to at least one of an amount of fuel or an amount of charge remaining, an estimated available travel distance for operating a motor of the watercraft before the watercraft runs out of energy. The computer code is further configured to cause the system to generate an overlay for a chart, wherein the overlay comprises a boundary area on the chart, wherein the boundary area corresponds to the estimated available travel distance and the effect of the tide on the watercraft. The computer code is further configured to cause the system to present the overlay on the chart to visually communicate the boundary area to indicate travel options for the watercraft from the current geographic location.

In some embodiments, the determined tidal data is based on tidal data from a tidal station corresponding to the current geographic location or a future potential geographic location of the watercraft.

In some embodiments, the estimated available travel distance is further based on at least one current weather condition.

In some embodiments, the computer code, when executed by the processor, is further configured to cause the system to generate an audible signal corresponding to a change in the boundary area over a determined threshold.

In some embodiments, the computer code, when executed by the processor, is further configured to cause the system to receive an indication of an end point, wherein the estimated available travel distance is further based on the watercraft reaching the end point such that the watercraft can reach any point within the boundary area and still have enough energy to return to the end point, and wherein the overlay indicates the travel options of the watercraft from the current geographic location to other locations while still being able to travel to the end point.

In some embodiments, the computer code, when executed by the processor, is further configured to cause the system to generate a suggested route within the boundary area to maximize energy efficiency of the watercraft between the current location of the watercraft and an end point.

In some embodiments, the computer code, when executed by the processor, is further configured to cause the system to determine an optimum speed to maximize energy efficiency of the watercraft between the current location of the watercraft and an end point.

In some embodiments, the computer code, when executed by the processor, is further configured to cause the system to receive cartographic data, wherein the boundary area is further based on the cartographic data.

In some embodiments, the computer code, when executed by the processor, is further configured to cause the system to receive tidal data for the current geographic location of the watercraft at a plurality of future times and determine a future plurality of points corresponding to the maximum distance the watercraft can travel in the plurality of directions based on the amount of fuel or the amount of charge remaining and the effect of the tide on the watercraft at the plurality of future times. The computer code may be further configured to cause the system to generate a plurality of overlays for the chart, wherein the plurality of overlays correspond to alternative boundary areas, wherein the alternative boundary areas correspond to the estimated available travel distance the watercraft can travel in each of the plurality of directions at each of the plurality of future times. The computer code may be further configured to cause the system to present a selected overlay comprising one of the plurality of overlays for the chart, wherein the selected overlay corresponds to a user selected time from the plurality of future times.

In some embodiments, the estimated available travel distance is further based on an isochronal calculation of the effect of the tides.

In some embodiments, the estimated available travel distance is further based on an isodistance calculation of the effects of the tides.

In some embodiments, the tidal data includes tidal data at one or more future times.

In another example embodiment, a marine electronics device is provided. The marine electronics device includes a position sensor configured to determine a current geographic location of a watercraft associated with the marine electronics device. The marine electronics device includes a display, a processor, and a memory including a computer program code. The computer code is configured to, when executed by the processor, cause the system to receive the current geographic location of the watercraft on a body of water and determine tidal data for the current geographic location of the watercraft indicating an effect of the tide on the watercraft. The computer code is further configured to cause the system to determine, based on energy remaining data corresponding to at least one of an amount of fuel or an amount of charge remaining, an estimated available travel distance for operating a motor of a watercraft before the watercraft runs out of energy. The computer code is further configured to cause the system to generate an overlay for a chart, wherein the overlay comprises a boundary area on the chart, wherein the boundary area corresponds to the estimated available travel distance and the effect of the tide on the watercraft. The computer code is further configured to cause the system to present the overlay on the chart to visually communicate the boundary area to indicate travel options for the watercraft from the current geographic location.

In another example embodiment a method of generating a boundary area for a watercraft on a body of water is provided. The method comprises determining a current location of the watercraft, determining an amount of energy remaining for operating the watercraft, and determining tidal data based on the current location of the watercraft. The method further includes calculating an estimated available travel distance in a plurality of directions from the current location of the watercraft based on the amount of energy remaining, generating a boundary estimation by connecting the plurality of points, and receiving tidal data for the body of water within the boundary estimation. The method further includes determining a tide effect on the watercraft based on the tidal data, and generating the boundary area based on the boundary estimation and the effect of the tide on the watercraft within the boundary estimation.

In some embodiments, the method further comprises receiving cartographic data of the body of water, and determining unnavigable areas based on the cartographic data, wherein generating the boundary area is further based on the unnavigable areas.

In another example embodiment, a system for indicating a navigable area that is reachable on a current amount of energy is provided. The system comprises a display, a processor, and a memory including a computer program code configured to, when executed by the processor, cause the system to receive position data indicating a current geographic location of a watercraft on a body of water and determine, based on energy remaining data corresponding to at least one of an amount of fuel or an amount of charge remaining, an estimated available travel distance for operating a motor of the watercraft before the watercraft runs out of energy. The computer code is further configured to cause the system to receive an indication of an end point and generate an overlay for a chart, wherein the overlay comprises a boundary area on the chart, wherein the boundary area corresponds to the current geographic location, the end point, and the estimated available travel distance. The computer code is further configured to cause the system to present the overlay on the chart to visually communicate the boundary area to indicate travel options for the watercraft from the current geographic location to other locations while still being able to travel to the end point.

In some embodiments, the amount of energy remaining is a reduced amount of energy, wherein the reduced amount of energy is less than an actual amount of energy remaining.

In some embodiments, the estimated available travel distance is calculated based on an average energy consumption of the watercraft.

In some embodiments, the estimated available travel distance is calculated based on travel characteristics of the watercraft.

In some embodiments, the computer code, when executed by the processor, is further configured to cause the system to receive chart data, wherein the chart data defines unnavigable areas. The boundary area is further calculated by determining a plurality of points corresponding to the estimated available travel distance in a plurality of directions from the current geographic location of the watercraft, based on the unnavigable areas; and connecting the estimated the plurality of points.

BRIEF DESCRIPTION OF THE DRAWINGS

Figure 1:
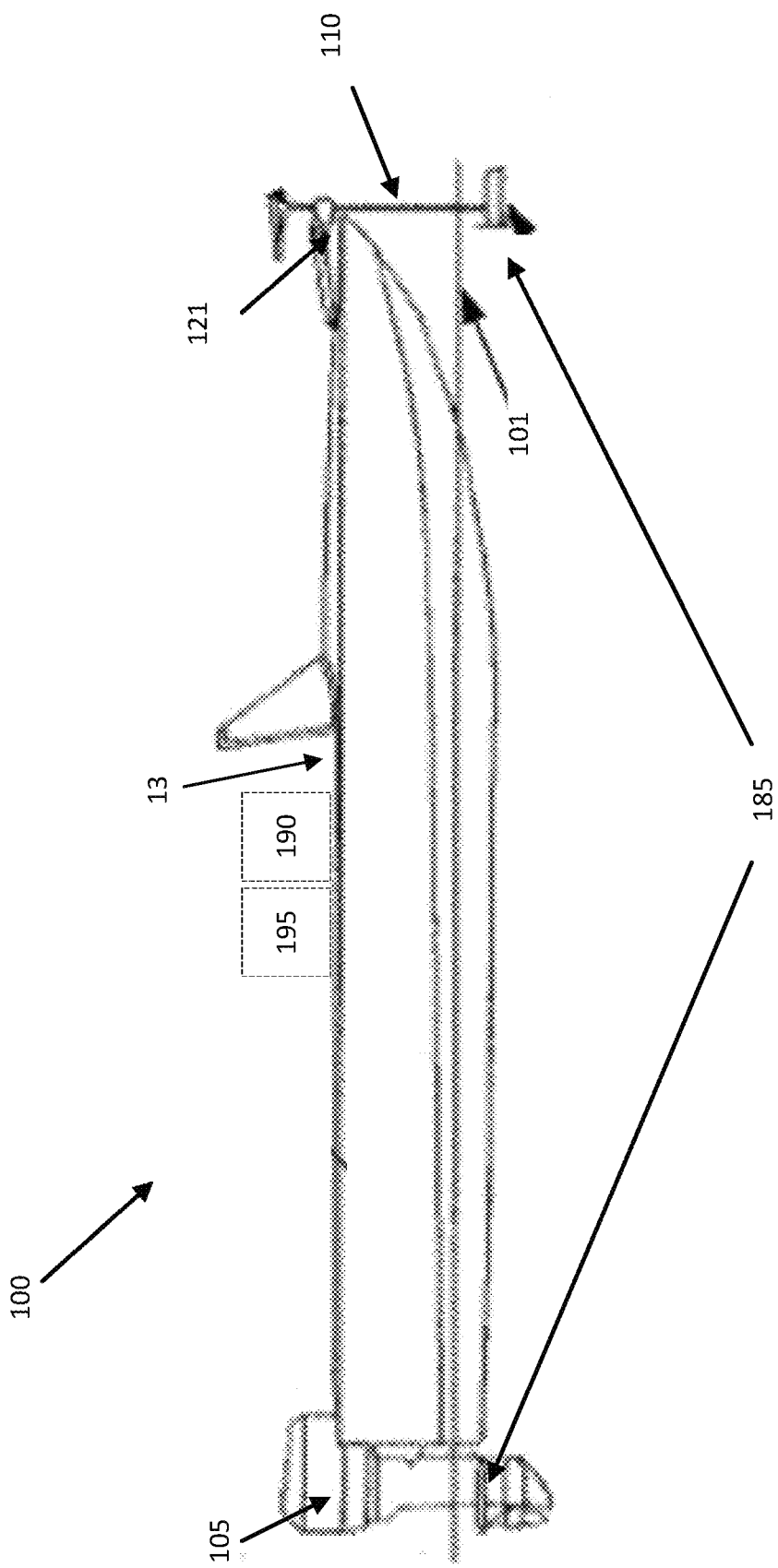
Figure 2:
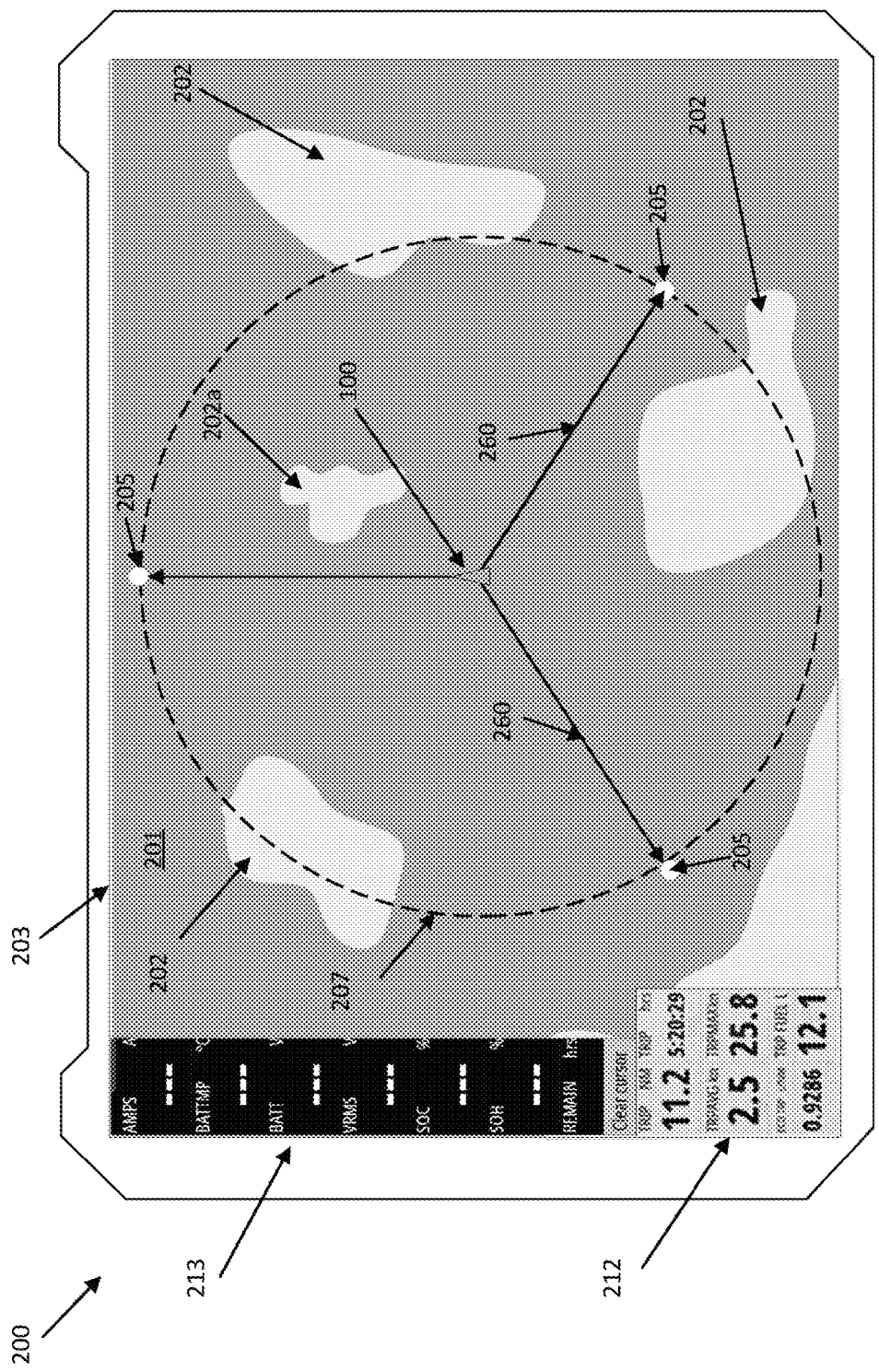
Figure 3A:
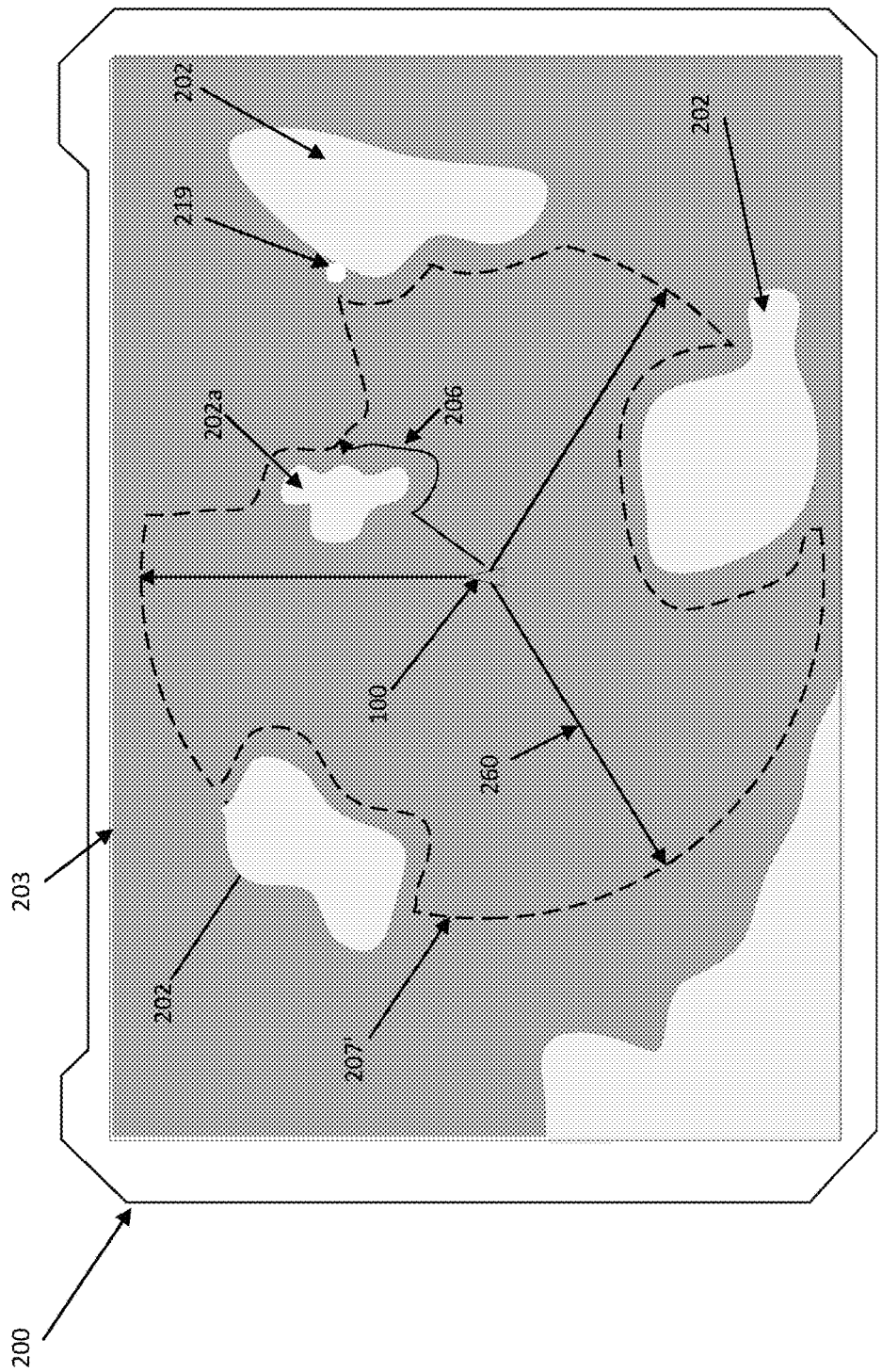
Figure 3B:
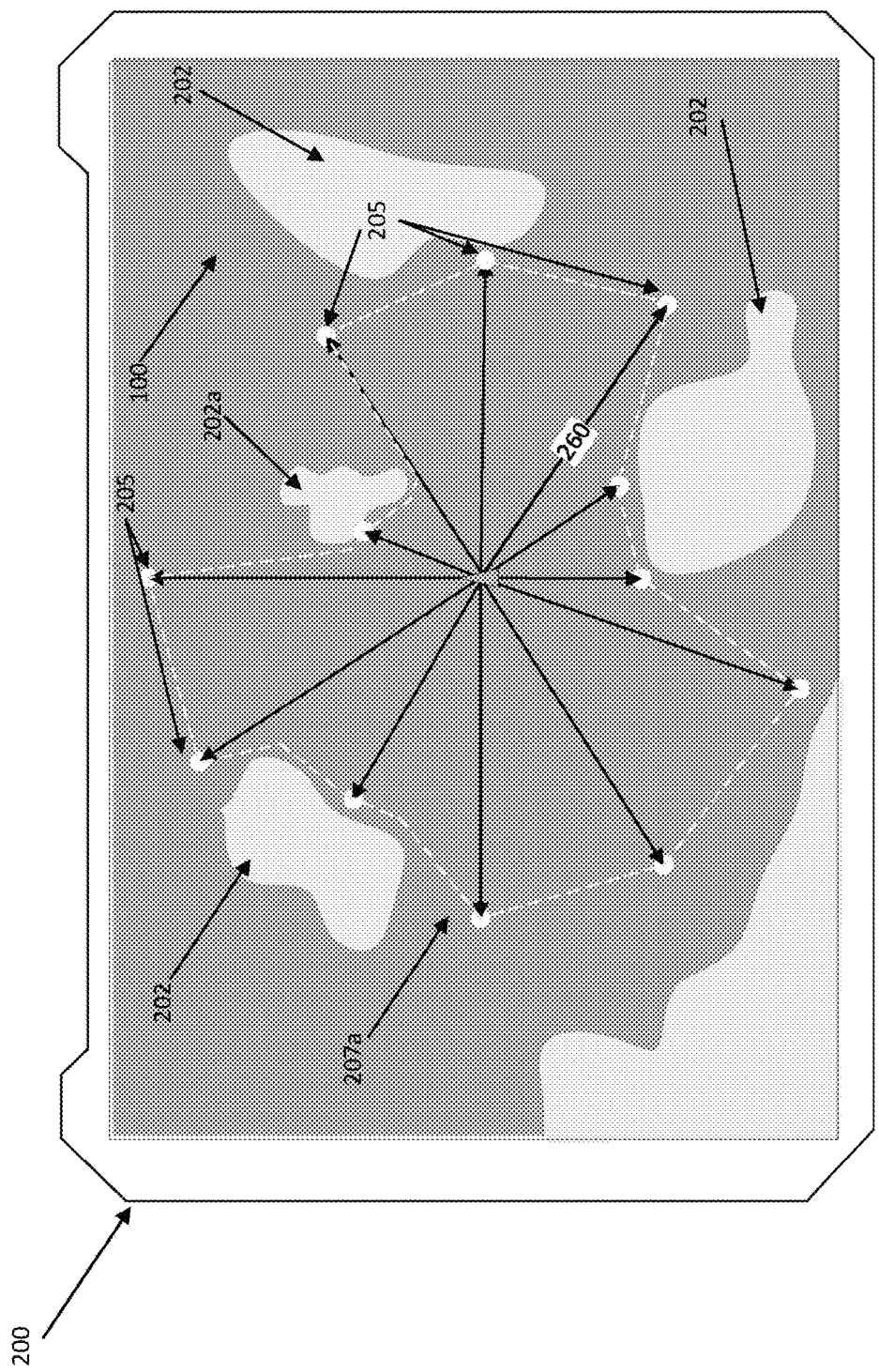
Figure 3C:
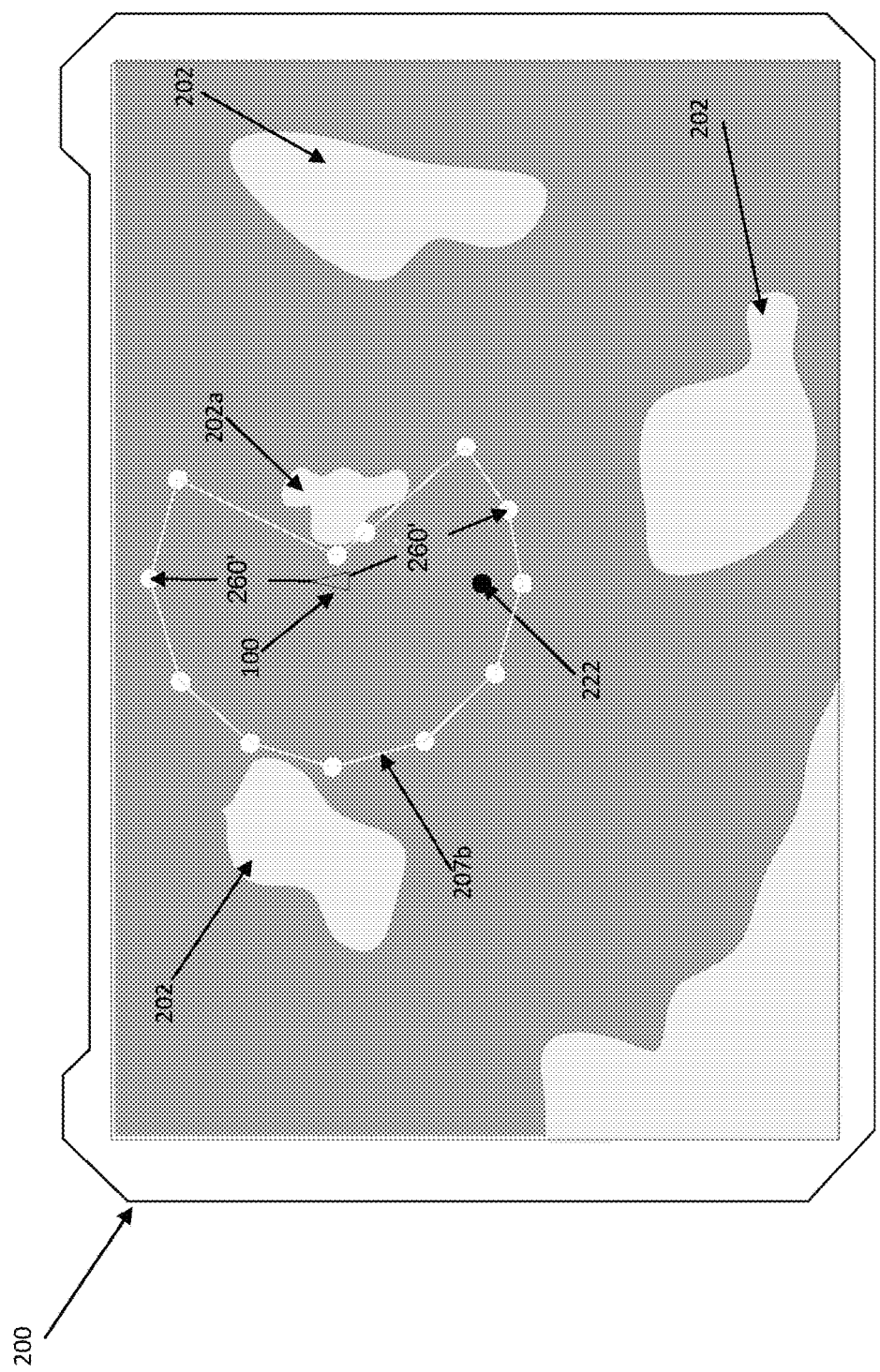
Figure 5A:
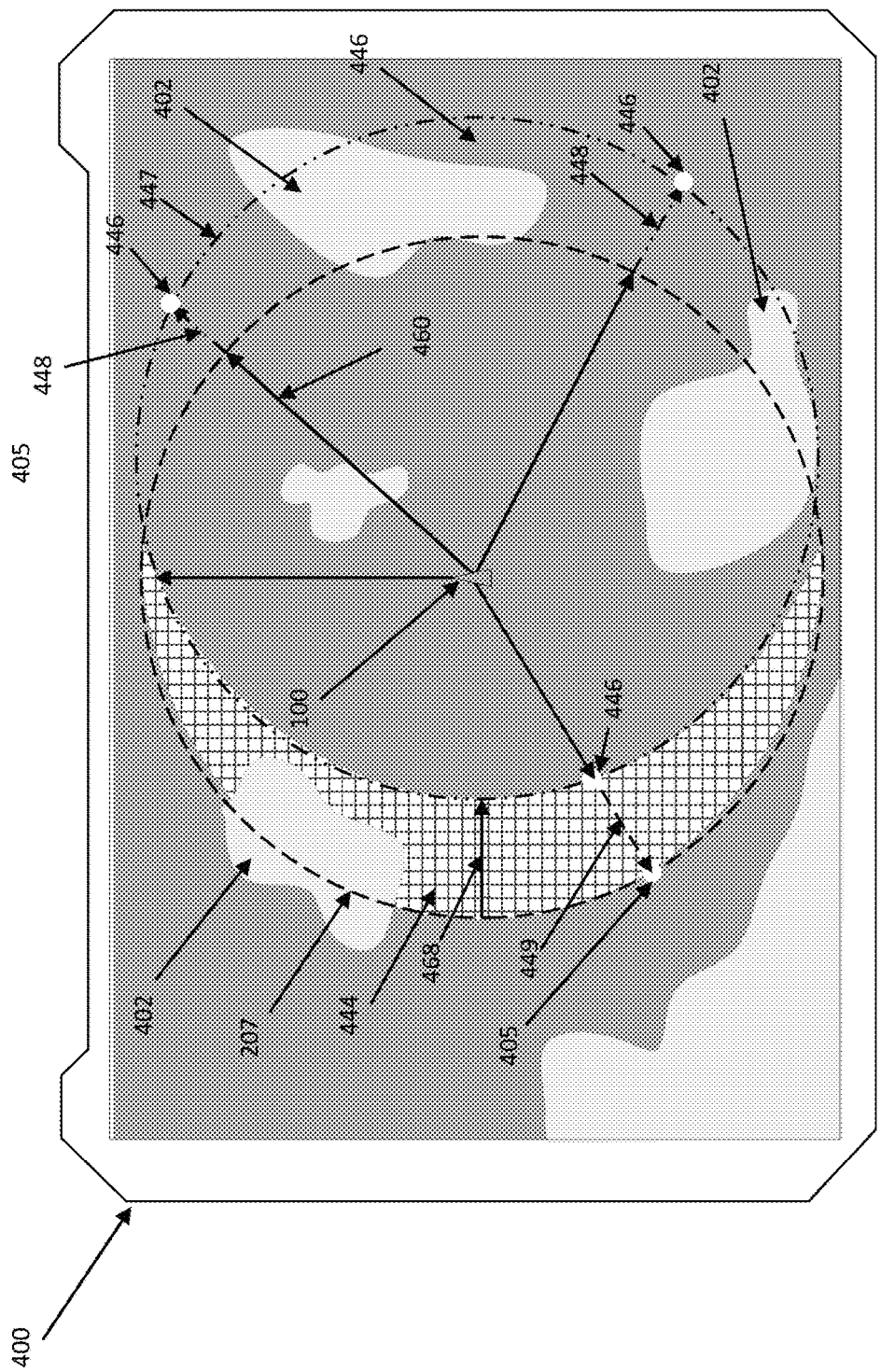
Figure 5B:
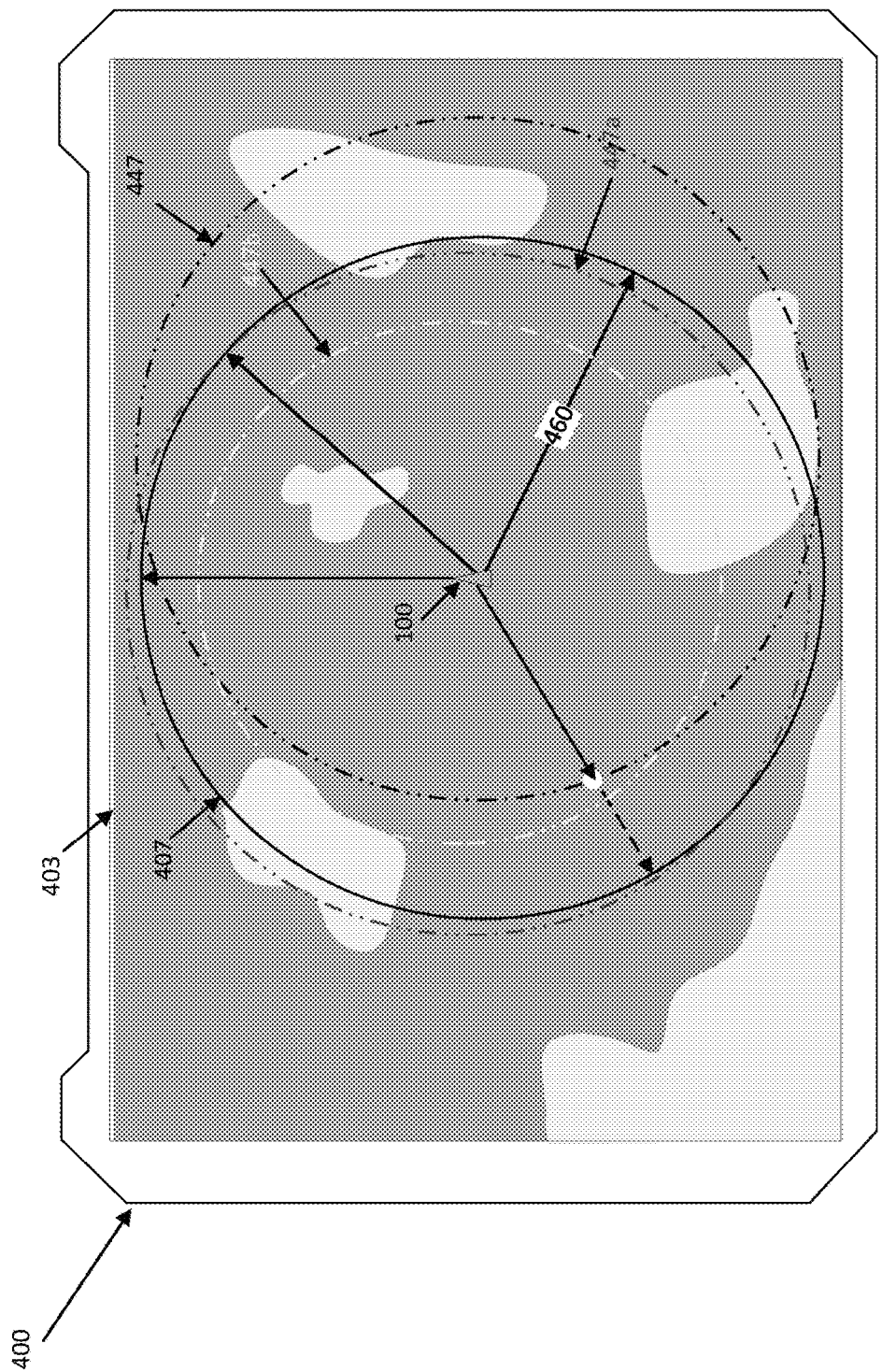
Figure 5C:
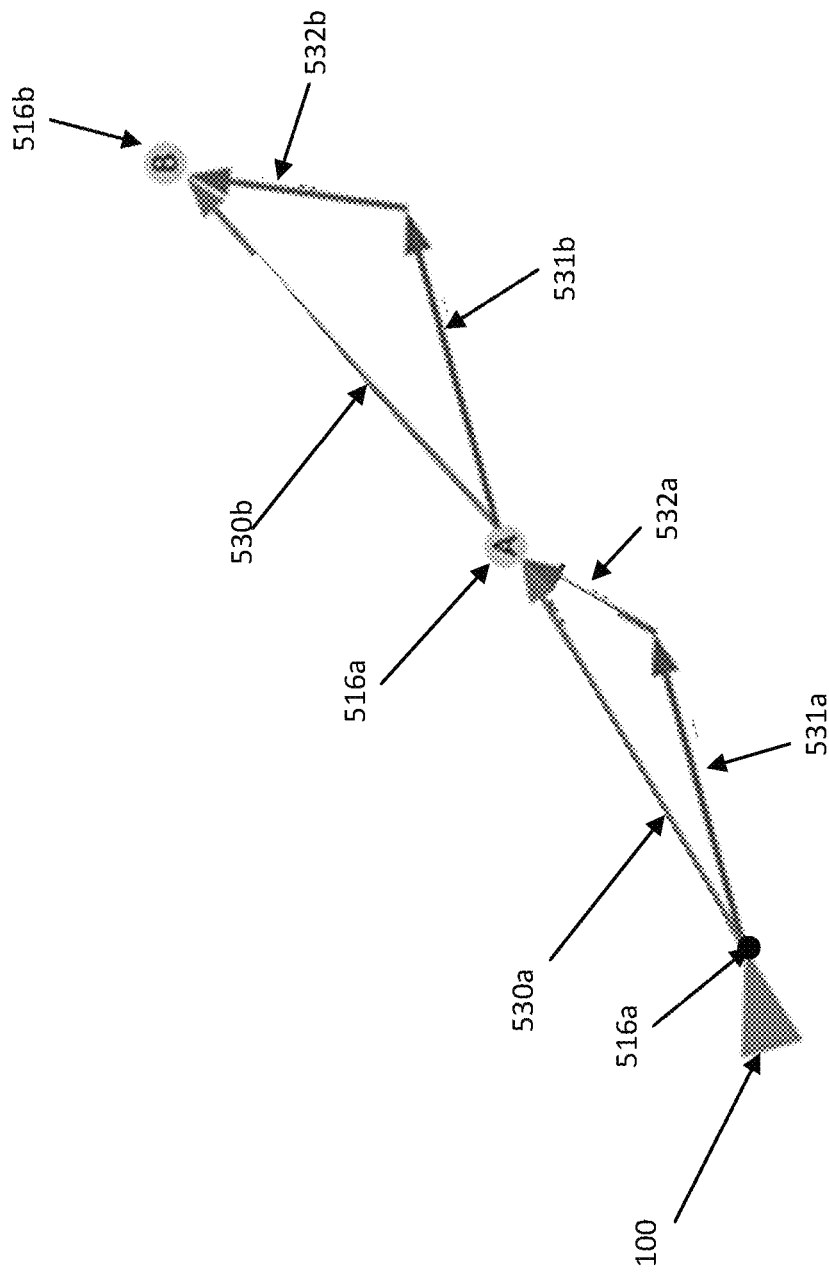
Figure 6:
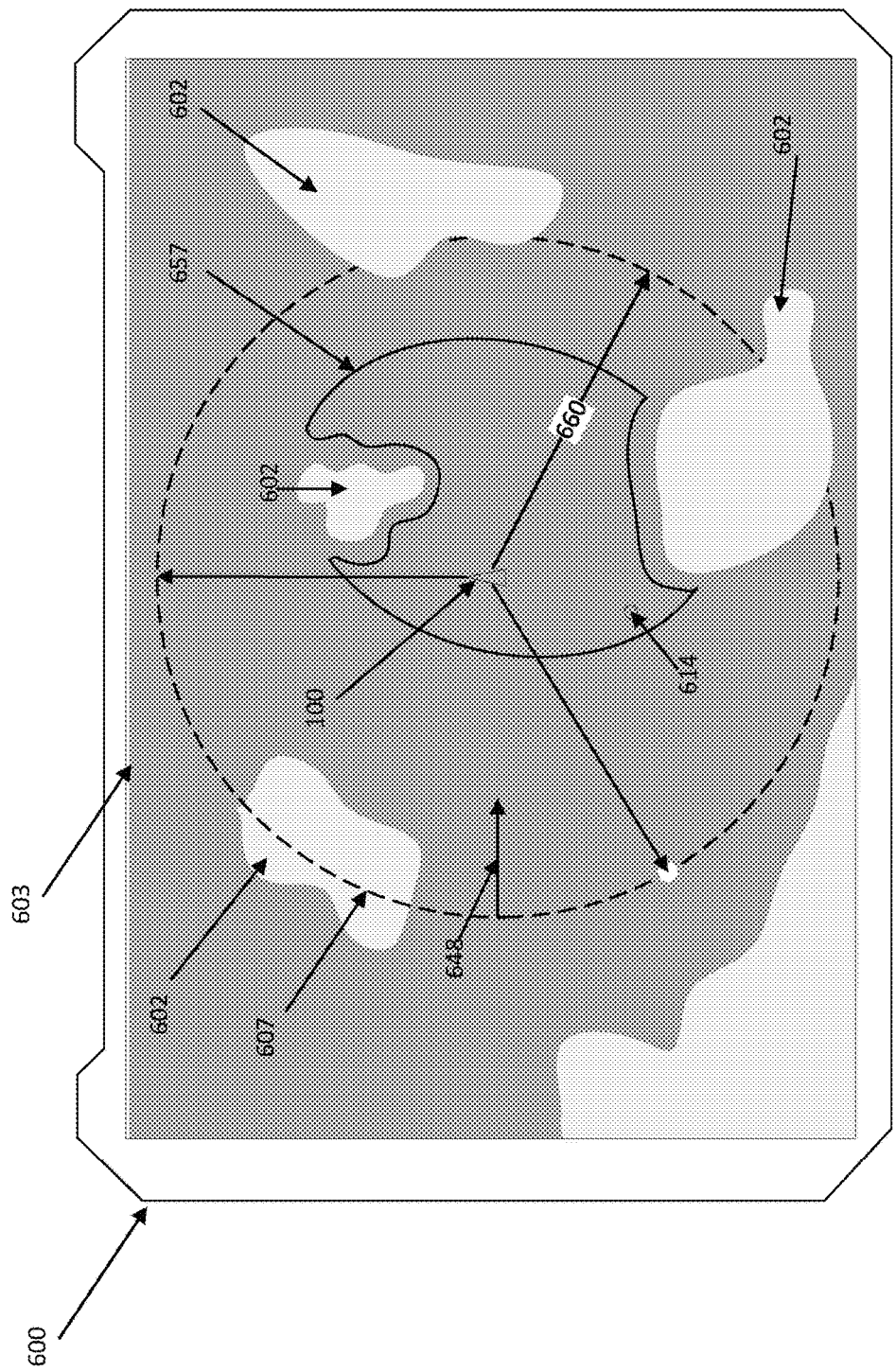
Figure 7:
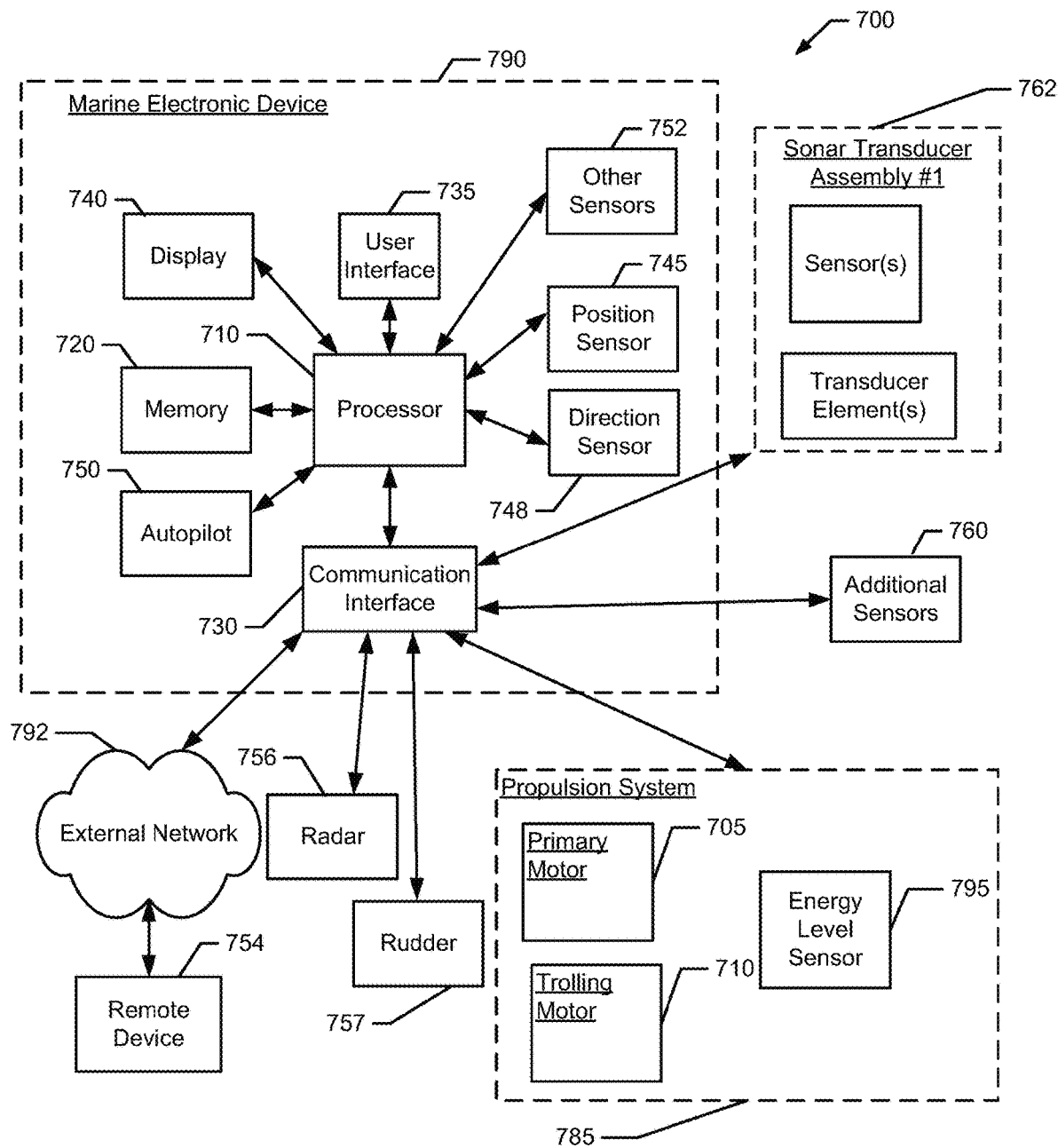
Figure 8:
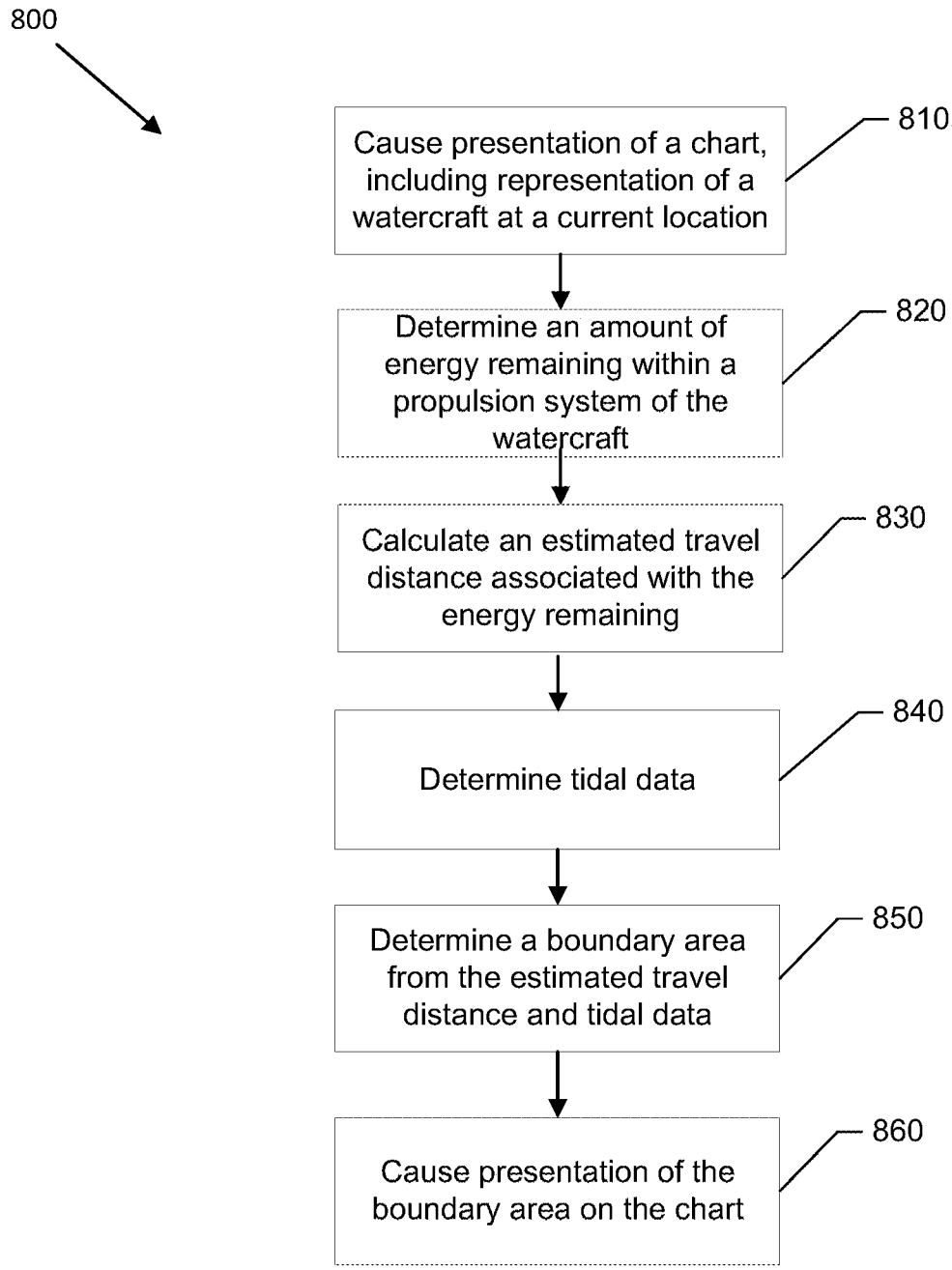
Figure 9:
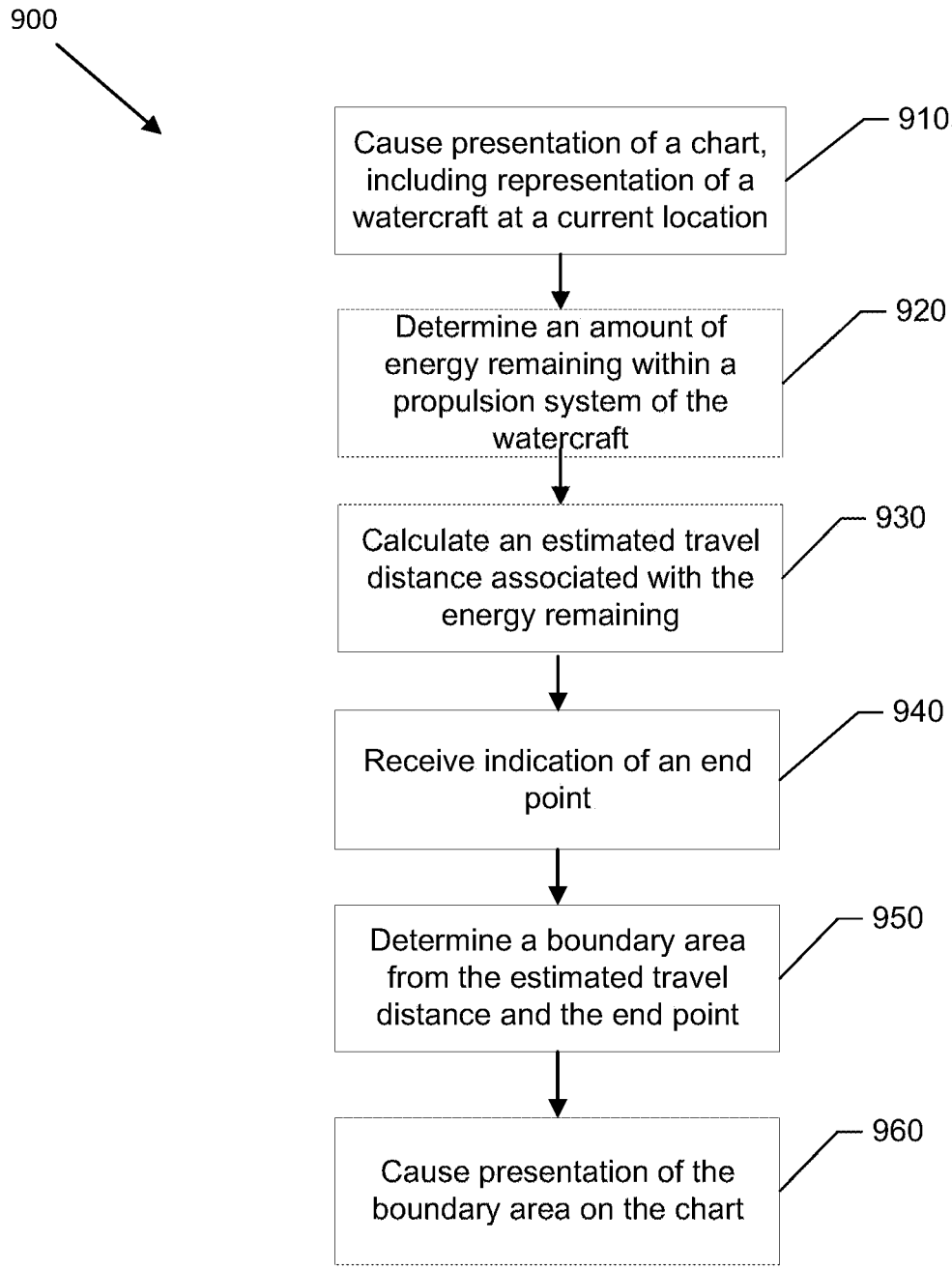

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2 illustrates an example display presenting a chart (e.g., a map), illustrating an example cartographic boundary area, in accordance with some embodiments discussed herein;

FIGS. 3A-B illustrate an example display presenting a chart, illustrating example calculations of an example boundary area, in accordance with some embodiments discussed herein;

FIG. 3C illustrates the example display presenting the chart, shown in FIG. 3B, illustrating an updated boundary area at a second position, in accordance with some embodiments discussed herein;

FIGS. 4A-D illustrate an example display presenting a chart, illustrating an example boundary area, and an example return boundary area, in accordance with some embodiments discussed herein;

FIGS. 5A-B illustrate an example display presenting a chart, illustrating an example tidal boundary area, in accordance with some embodiments discussed herein;

FIG. 5C illustrates an example calculation of a tidal effect on an estimated available travel distance, in accordance with some embodiments discussed herein;

FIG. 6 illustrates an example display presenting a chart, illustrating an example boundary area, in accordance with some embodiments discussed herein;

FIG. 7 illustrates a block diagram of an example system with various electronic devices, marine devices, and secondary devices shown, in accordance with some embodiments discussed herein; and FIG. 8-9 illustrate flowcharts of example methods for determining boundary areas indicating possible travel options for a watercraft on a body of water, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 on a body of water 101. The watercraft 100 may have a propulsion system 185 to propel the watercraft 100 along the body of water 101. In some embodiments, the propulsion system 185 comprises a primary motor 105 attached to its rear, and/or a trolling motor 110 attached to its front by a trolling motor mount 121. The primary motor 105 and/or trolling motor 110 may be a gas-powered motor and/or an electric-powered motor. In some embodiments, the propulsion system 185 may further include at least one energy level sensor 195. The energy level sensor 195 (which may be multiple energy level sensors), may determine the amount of fuel left in a gas-powered motor and/or the amount of charge remaining within a battery in an electric-powered motor. Various example level sensors are contemplated for use as an energy level sensor, such as a voltage sensor, current sensor, or similar (e.g., for measuring an amount of charge remaining in a battery for an electric-powered motor) or a time-of-flight sensor, an infrared sensor, a capacitance sensor, a weight sensor (e.g., for measuring an amount of fuel remaining in a fuel tank for a gas (or diesel)-powered motor).

In some embodiments, a marine electronics device 190 may be associated with the watercraft 100. The marine electronics device 190, may be configured to receive data from the propulsion system 185 including the primary motor 105, the trolling motor 110, the energy level sensor 195, and other systems within the watercraft 100. In some embodiments, the marine electronics device 190 may be movable within the watercraft 100, and in other embodiments, the marine electronics device 190 may be positioned at a helm 13 of the watercraft 100.

FIG. 2 illustrates an example display 200, such as on a marine electronic device (e.g., 190 in FIG. 1, or the display 740 of the marine electronic device 790 shown in FIG. 7) generated by a system, presenting a chart 203. The chart 203 may present a body of water, and distinguish water 201 from land 202. The chart 203 may include a representation of the watercraft 100 at a current location within the chart 203 (e.g., such may be determined based on position data). As illustrated, the watercraft 100 may have a relative size, such as may correspond to the zoom level of the chart 203, and a direction that may indicate in which direction the watercraft 100 is pointing (e.g., may be based on orientation data or recent/current position data). The chart 203 may further include depth readings, such as may be pre-stored and/or may be updated based on various incoming data (e.g., tidal data, sonar data, satellite data, etc.). In some embodiments, the chart 203 may be stored in memory and/or gathered via an external or internal network. The position and/or orientation of the watercraft 100 may be determined by position and/or orientation data, such as from a global positioning system (GPS), and/other sources.

In some embodiments, the chart 203 may include data 212 associated with the current trip and location of the watercraft 100. In some embodiments, the data 212 may include a current position, depth reading, current speed, headings, trip distance, time and/or other associated data. In some embodiments, the chart 203 may further include a selection screen 213 for implementing various functionality, such as toggling between charts, creating new tracks, indicating desired determined areas, among many other things. The display 200 may be further configured to present and/or cease presenting various data, as described above, from the chart. Further, the system may be configured to zoom in and zoom out on various points of the chart, and adjust the relative size of the watercraft, tracks, and other presented data accordingly.

In some embodiments, the system may be configured to calculate an estimated available travel distance 260 of the watercraft 100 based on an amount energy remaining with the primary motor, the trolling motor, or a combination of the primary and trolling motors (or other motors/propulsion systems). As used herein it should be understood the term "energy" includes fuel sources including gasoline, diesel, and other liquid fuels, solid fuels, stored electricity, for example within batteries or fuel cells, or other sources of fuels or energy which may be used within the motor to propel the watercraft.

In some embodiments, the watercraft 100 may utilize a gasoline powered motor, while in other embodiments, the watercraft 100 may utilize an electric motor. In some embodiments, the watercraft 100 may utilize a hybrid engine configured to use gasoline and electricity. In a gasoline powered motor, the system may receive an indication of the amount of fuel remaining (e.g., gallons or liters) indicating the amount of energy remaining. While in embodiments using an electric motor, the system may receive an indication of charge level remaining (e.g., 10%, 40%) to indicate the amount of energy remaining.

In some embodiments, the estimated available travel distance 260 may be calculated using an average energy consumption (e.g., miles per gallon (MPG), miles per kWh). The average energy consumption may be based on historical data, and/or manufacture data. In some embodiments, the average energy consumption may be updated while the watercraft 100 is in use, while in some embodiments, a predetermined average energy consumption may be used throughout the entire calculation. In some embodiments, the system is configured to show the estimated available travel distance 260 on the display chart. The estimated available travel distance 260 may be displayed within the data 212 illustrated on the chart 203.

In some embodiments, the system is configured to generate a boundary area 207. The boundary area 207 may illustrate how far the watercraft 100 can travel from the current location based on the amount of energy remaining. In some embodiments, the system may calculate the boundary area 207 based on the estimated available travel distance 260. In some embodiments, the boundary area 207, as illustrated in FIG. 2, may be defined by the estimated available travel distance 260 extending in each direction from the watercraft 100 thereby defining the boundary area 207 as a circle, where the estimated available travel distance 260 defines the radius.

However, utilizing this calculation accounts for travel options with a straight trajectory (e.g., as the crow flies), and does not account for various factors including land 202, tides, desired way points, or destinations, among other things. To account for such variation the system may take into account one or more of these variables to generate a boundary area to visually communicate to a user the possible travel options based on the amount of energy remaining within the watercraft 100 and other variables, such as noted herein.

In some embodiments, the system may account for land masses 202 which are unnavigable when determining a boundary area 207'. As illustrated in FIG. 2, the boundary area 207 as calculated includes destinations on land masses 202, and destinations which would require traveling across a land mass 202a. Thus, the illustrated boundary area 207 includes destinations which are not accessible by the watercraft 100 under the current conditions.

The system may be configured to accommodate for the land masses 202 which are unnavigable by the watercraft 100. In some embodiments, the system may access a database, (e.g., chart data) which may define no-go areas. In some embodiments, the no-go areas may include land masses, shallow waters (e.g., based on the draft of the watercraft), protected areas, shipping lanes, or other areas which may limit and/or prohibit travel. In some embodiments, the tides may affect the no-go areas. For example, an area may be navigable during high tide, but may be unnavigable at low tide due to a shallow depth. In some embodiments, a user may add or remove conditions from being considered no-go areas.

In some embodiments, the system may calculate points equal to the maximum range reachable by traveling around the no-go areas, as illustrated in FIG. 3A. In some embodiments, the system may determine if there is a no-go area which is navigable around, based on the amount of energy remaining, for example, the land mass 202a. As illustrated the distance to travel around the land mass 202a is less than the estimated available travel distance 260, therefore, the watercraft may travel around the land mass 202a with the current energy remaining.

In some embodiments, the boundary area 207' be less than the estimated available travel distance 260 from the current location of the watercraft 100. In some embodiments, portions of the body of water 201 within the estimated available travel distance 260 may include no-go areas. For example, a point 219 which is less than the estimated available travel distance 260 may reside within a no-go region as the water 201 near land 202 may be too shallow, include sandbars, define a no-wake zone, or other factor which prevents the watercraft 100 from traveling to the point 219.

In some embodiments, the chart 203 may present the no-go areas with an indication on the chart 203. In some embodiments, the indication may correspond to the type of no-go area, for example the land masses 200 may be shown in a first color or pattern, while shallow waters may be displayed in a different color or different pattern. In some embodiments, the indication for no-go areas may be the same for each type of area. In some embodiments, the no-go areas may be grouped into categories, and each category may be presented with a different indication. For example, no-go areas including no-wake zones, shallow waters, and heavily populated areas may include the same indication, as they each require a user to slow down the watercraft 100. While no-go areas include shipping lanes and marine protected areas may be indicated in the same color or pattern as the watercraft 100 may not cross those waters.

In some embodiments, such as illustrated in FIG. 3B, the system may define a boundary area 207a by calculating a plurality of points 205 spaced no more than the estimated available travel distance 260 from the current location of the watercraft 100. In some embodiments, the system may use an existing automatic routing algorithm, which includes accounting for land masses, and other no-go zones, to run multiple destinations defined by a spread of angles (e.g., 5-30 degrees) and define a plurality of points 205 on these routes wherein the distance from the watercraft 100 to each of the plurality of points 205 is no more than the estimated available travel distance 260 of the watercraft 100. The system may then determine the boundary area 207a by connecting the plurality of points 205. However, as illustrated updated boundary area 207a may not capture the entirety of the navigable area, as the system may not calculate the opposite side of the land mass 202a as being within the estimated available travel distance 260 available to the watercraft 100, as the system may calculate the estimated available travel distance 260 with respect to traveling at a single heading along the entirety of the estimated available travel distance 260.

In some embodiments, the plurality of points method may utilize the same navigation restrictions used in automatic routing or autopilot.

In some embodiments, the boundary area 207a may be configured to be updated after a triggering event. FIG. 3C illustrates an updated boundary area 207b. After the triggering event, the system may determine an updated estimated available travel distance 260'. The updated travel distance may then be used to determine the updated boundary area 207b. As illustrated, a starting point 222 may be within the updated boundary area 207b, however the watercraft 100 may travel such that the starting point 222 is no longer accessible with the remaining energy.

In some embodiments, the triggering event may be the passage of time, change in the tides, change in fuel efficiency, change in weather conditions, change in current location, change in a no-go zone, or other events which may influence the estimated available travel distance. In some embodiments, the system may produce the updated boundary area 207b after a predetermined amount of time, for example, 30 seconds, 1 minute, or 5 minutes.

In some embodiments, the system may be configured to set off an alarm if the updated estimated available travel distance changes more than a threshold amount. In some embodiments, the threshold amount may be distance based, or percentage based. In some embodiments, the threshold amount may be determined based on a predicted travel difference. The predicted travel difference may be the difference between the estimated available travel distance 260, and a distance traveled. In some embodiments, the threshold amount may be up to 5 miles difference, up to 10 miles difference, or in some embodiments, up to 15 miles difference. In some embodiments, the threshold amount may be percentage based, and may be up to 3% difference, up to 5% difference or up to 7% difference.

In some embodiments, the updated estimated available travel distance 260' may incorporate the energy efficiency of the watercraft 100. For example, the boundary area 207 calculated using the estimated available travel distance 260 may be based on historic data relating to prior energy efficiency (e.g., MPG, or miles per kWh). In some embodiments, the system may update the energy efficiency at a regular interval. In some embodiments, the energy efficiency may change across the course of a trip. Thus, the updated estimated available travel distance 260' may use an updated energy efficiency calculation in the updated boundary area 207b determination.

As discussed with reference to FIGS. 3B-C, the boundary area 207a and the updated boundary area 207b may not include an indication of the distance where a user needs to start their return trip, to ensure the watercraft 100 has enough energy to make it back to the starting point 222. In addition to knowing the boundary area corresponding to the estimated available travel distance 260 or distance to empty, it may be desirable for a user to know a return boundary area, or a range at which the watercraft 100 must return to the starting point or known destination to ensure the watercraft 100 has enough energy.

Figure 4A:
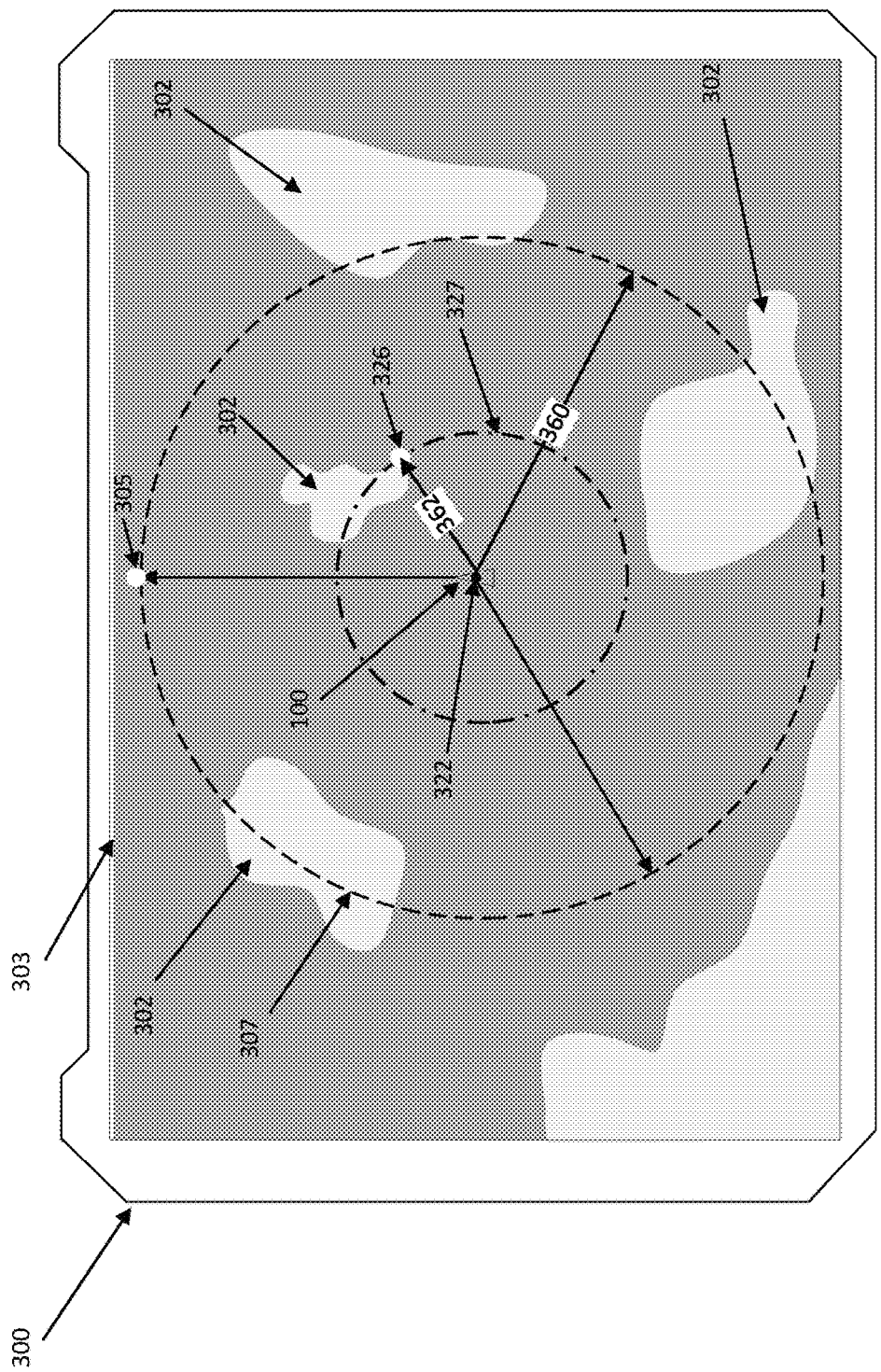

In some embodiments, the watercraft 100 may start and end at the same location, as illustrated in FIG. 4A. In some embodiments, the system may present a chart 303 on a marine electronics device 300. In some embodiments, the system may determine a boundary area 307 based on an estimated available travel distance 360. The boundary area 307 may form a circle about the watercraft 100, with the estimated available travel distance 360 as the radius. However, as discussed, the boundary area 307 utilizing the estimated available travel distance 360 may not account for a return trip. For example, if the watercraft 100, beginning at a starting point 322, traveled to a point 305 the estimated available travel distance 360 away, the watercraft 100 would run out of energy at or around the point 305 and be unable to return to the starting point 322.

Thus, in some embodiments, the system may be configured to determine a return boundary area 327. The return boundary area 327 may be an adjusted boundary area wherein a return radius 362 of the return boundary area 372 corresponds to half of the estimated available travel distance 360 of the watercraft, such that the watercraft 100 may travel to any point about the return boundary area 327 and still have enough energy remaining to return to the starting point 322.

In some embodiments, the boundary area 307 and/or the return boundary area 327 may be calculated based on the entire amount of energy remaining, while in other embodiments, the boundary areas 307, 327 may be calculated based on a reduced amount of energy. In some embodiments, the user may set the reduced amount of energy, while in other embodiments the system may determine a preset reduced amount of energy. In some embodiments, the reduced amount may be 20%, 15%, 10% or even 5%. In some embodiments, the reduced amount may be based on the capacity of the energy storage. For example, a watercraft 100 having a 30 gallon fuel tank the system may calculate the estimated available travel distance 360 based on a reduced amount of energy of 28 gallons.

In some embodiments, the return boundary area 327 may be updated as the watercraft 100 travels from the starting point 322. In some embodiments, the return boundary area 327 may be updated after a triggering event. As discussed above, the triggering event may be the passage of time, change in the tides, fuel efficiency, weather conditions, change in a no-go zone, or other events which may influence the estimated available travel distance. In some embodiments, the system may update after a predetermined amount of time, for example, 30 seconds, 1 minute, or 5 minutes.

In some embodiments, the return boundary area 327 may update as the watercraft travels. For example, as the watercraft travels, the return boundary area may become skewed such that the return boundary area 327 is oblong, wherein the return radius 362 may be smaller in the direction of travel, and larger in the opposite direction.

Figure 4B:
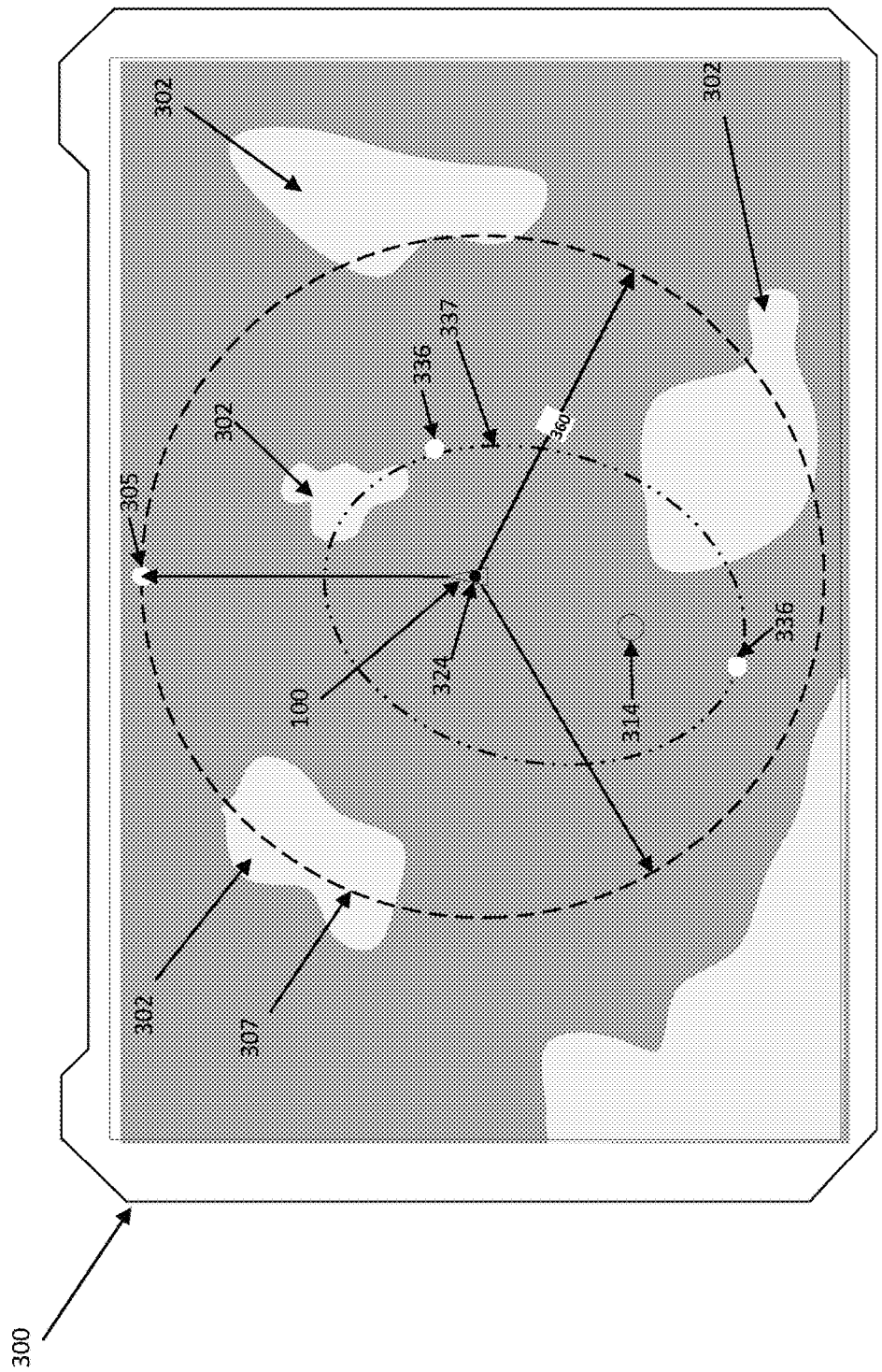

To explain, as illustrated in FIG. 4B, in some embodiments, a current location 324 of the watercraft 100 may be different than an end point 314. The system may calculate a changing boundary area 337 such that any point within the changing boundary area 337 may be reached, while maintain enough energy to navigate ultimately to the end point 314. In some embodiments, the changing boundary area 337 may be updated upon a triggering event. As discussed above, the triggering event may be the passage of time, change in the tides, change in fuel efficiency, change in weather conditions, change in location, change in a no-go zone, or other events which may influence the estimated available travel distance. In some embodiments, the system may update after a predetermined amount of time, for example, 30 seconds, 1 minute, or 5 minutes.

Figure 4C:
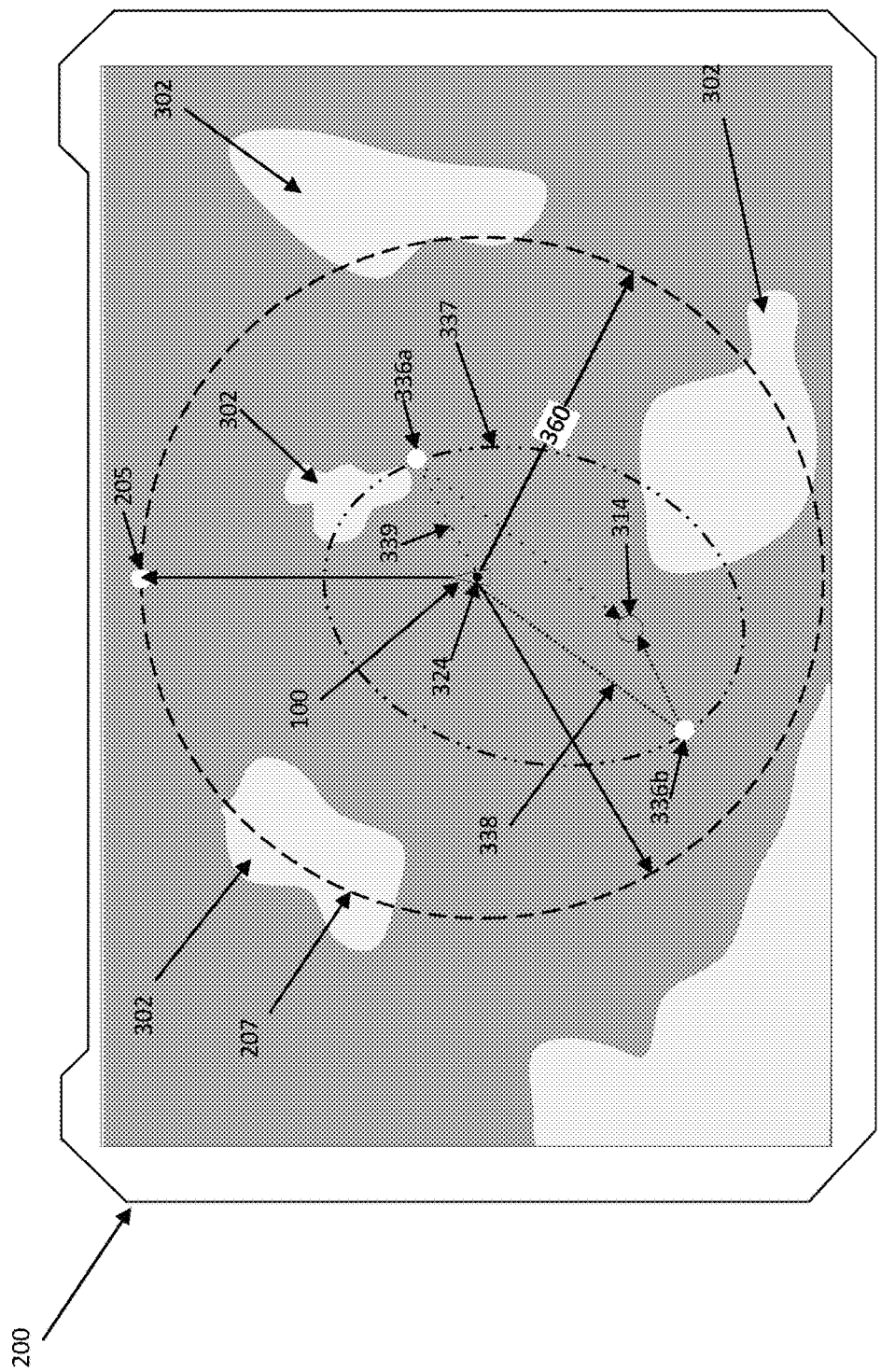

In some embodiments, the system may be configured to determine routes within the changing boundary area 337 from the current location of the watercraft 100, as illustrated in FIG. 4C. In some embodiments, the one or more routes 338, 339 may be based on the estimated available travel distance 360 the watercraft 100 can travel from the current location 324.

In some embodiments, a user may specify one or more waypoints within the changing boundary 337. The system may be configured to determine one or more routes from the current location of the watercraft, to each of the one or more waypoints. In some embodiments, the routes may be based on a determined order of the one or more waypoints, while in other embodiments, the routes may be determined to maximize efficiency of the watercraft (e.g., minimize energy usage, minimize backtracking, etc.).

Figure 4D:
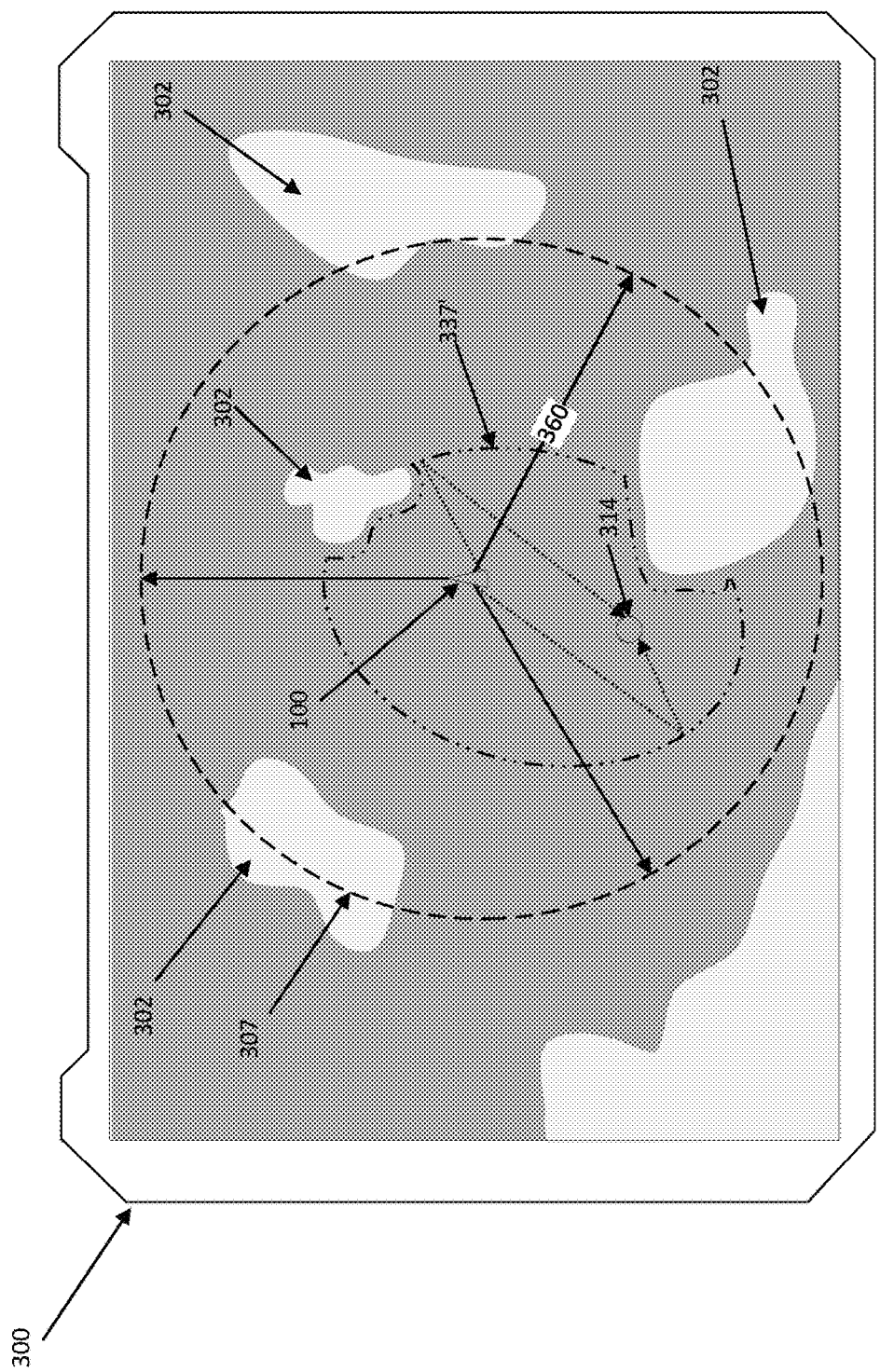

In some embodiments, the changing boundary area 337, and the return boundary area 327 may include one or more no-go areas, as discussed above. As illustrated in FIG. 4D, the system may account for the no-go areas by updating the changing boundary area 337 shown in FIG. 3C to an updated changing boundary area 337' to remove the no-go areas, as discussed with reference to FIGS. 2A-C (e.g., land masses 302). In some embodiments, the system may determine the changing boundary area 337, and update the changing boundary area 337 based on the no-go areas.

In some embodiments, the range of the watercraft 100 may be affected by natural variables, for example, tides, wind speeds, chop, wave size, etc. In some embodiments, the system may be calibrated to account for such variables. In some embodiments, the system may determine tidal data. Determination of the tidal data may include receiving tidal data, such as from one or more tidal stations (e.g., ports with tidal data available, chart points with tidal data available, etc.), charts, satellites, other watercraft, remote servers, etc., and/or calculating tidal data, such as based on received tidal data or other data, sensed tidal data or other data, etc. In some embodiments, the determined tidal data may be near the current location of the watercraft 100 and/or related to potential future locations of the watercraft 100, such as along the determined route or within the boundary area. In some embodiments, the tidal data may include times for high tide and low tide. In some embodiments, the tidal data may include direction and strength of currents. In some embodiments, the tidal data may include tidal data corresponding to future times (e.g., tidal data at any future time, such as when a trip is planned, etc.). In some embodiments, the tide may work with the watercraft 100 to effectively increase the range able to be traveled (e.g., based on current data within the tidal data), while in other embodiments, the tide may work against the watercraft to effectively decrease the range the watercraft 100 may travel (e.g., based on current data within the tidal data). For example, if a watercraft can travel 20 knots in 1 hours, and the current is in favor of the watercraft by 2 knots, the watercraft can travel 22 knots. Inversely if the current is working against the watercraft, the watercraft may only travel 18 knots since it needs to compensate for the offset of the current.

As such, returning to FIG. 2, the boundary area 207 does not account for tide shifts or other natural variables. FIGS. 5A-B illustrate a tidal boundary area 447 accounting for the effects of natural variables on the watercraft 100. In some embodiments, such as illustrated in FIG. 5A, the tide may shift the boundary area to the east (e.g., the right of the display 400). In some embodiments, the tidal boundary area 447 may take the same shape as the boundary area 207. In some embodiments, the tidal boundary area 447 may be determined by calculating an estimated available travel distance 460 for the remaining energy in the propulsion system, determining the boundary area 207, determining an effect of the tide 468 (e.g., current), and offsetting the boundary area 207 by the effect of the tide 468. Thus, a portion 444 of the boundary area 207 is not reachable by the watercraft 100 due to the effects of the tide 469 (e.g., current), while a second portion 446 is reachable due to the effects of the tide 468.

As illustrated, the tidal boundary area 447 allows the watercraft 100 a tidal increase 448, when traveling with the tide, while the tide effects 468 induce a tidal decrease 449 when traveling against the tide. For example, in an embodiment, the tidal boundary area 447 may be circular and therefore the tidal decrease 449 may vary in any western direction based on the watercrafts 100 orientation to the tide (e.g., the tidal decrease 449 in a watercraft heading directly opposing the tide would be the greatest, while the tidal decrease 449 in a watercraft heading perpendicular to the tide would be the smallest).

Similarly, the tidal increase 448 may vary in any eastern direction based on the watercrafts 100 orientation to the tide (e.g., the tidal increase 448 in a watercraft heading directly aligned with the tide would be the greatest, while the tidal increase 448 in a watercraft heading perpendicular to the tide would be the smallest).

Said differently, to create a tidal boundary area 447, the system may use the boundary area 207 and offset the boundary area 207 by the effect of the tide 468 calculated over the estimated available travel distance 460 (e.g., max distance) and, for example, average speed (e.g., cruising speed, or planned speed). For example, if the estimated available travel distance 460 is about 5 hours of travel time, then the complete tidal effect over those 5 hours may be calculated into an average to offset the boundary area 207 to create the tidal boundary area 447. In some embodiments, the effect of the tide 468 may be an offset in a single direction (see e.g., FIG. 5A), for example the tide flowing out for 5 hours, while in some embodiments, the tidal offset may be over a period of time at the top of the tide where the tide comes in and goes out over the course of the travel time (see e.g., 447b of FIG. 5B). For example, the tide may be going out for 2.5 hours, and coming in for the remaining 2.5 hours. In such an example, the tidal boundary area 447 may be only minimally offset from the boundary area 207.

In some embodiments, such as illustrated in FIG. 5B, the system may be configured to present tidal boundary areas corresponding to different times, and/or different days. Since tides are not cyclical in a 24-hour period, the tidal boundary area 447 of the watercraft 100 may change based on the day and time of the planned travel. FIG. 5B illustrates a chart 403 illustrating a plurality of tidal boundary areas 447 and a boundary area 407, wherein the boundary area 407 is based on the estimated available travel distance 460 without tidal, geographical, or return considerations. Each of the plurality of tidal boundary areas 447, 447a, 447b, 447c illustrate an area of travel reachable at the determined start time and location.

For example, the tidal boundary area 447 illustrates a travel route where the tide is directed towards the east (e.g., right side of the display 400) the entire trip. While a second tidal boundary area 447a illustrates a second time where the tide is aligned with the planned route of travel for the entire trip. In contrast, a third tidal boundary area 447b illustrates a third time where the tide is opposite the heading of the planned route of travel over the entire trip, thereby reducing the entire area of the third tidal boundary area 447b. Notably, in some embodiments, though not shown in FIG. 5B, other variables may be taken into account when generating the boundary area, such as no-go areas, etc.

In some embodiments, the user may indicate a time of departure and a time of return. The system may determine how the tides will change during that time. For example, if the tides are working with the watercraft on the way out and the return the boundary area may be larger than if the tides are working against the watercraft on both the way out and the way back. As another example, the tides may be working against the watercraft on the way out, but may work with the watercraft on the return, effectively negating the effect of the tide on the watercraft over the entirety of the trip. In some embodiments, the user may not travel far or long enough for the tides to affect the travel.

In some embodiments, the system may present the tidal boundary area 447 at a user input time. In some embodiments, a user may input various times, to see how the tides, and other natural variables may impact the boundary area. In some embodiments, a user may want to travel at a time when the tide will have the least effect on the watercraft, thus a user may input a plurality of departure times and determine a time where the tidal boundary area 447 reflects the desired travel plans. While in other embodiments, a user may have a specific time frame of travel and may need to plan based on how the tides will affect the watercraft 100 during that time of travel. In some embodiments, the system may be configured to determine and recommend one or more suggested times to depart on one or more legs of the trip, such as based on tidal (or other) conditions. This may be used to maximize energy efficiency and/or enable a user to reach a desired destination (e.g., "wait to leave until 2 pm in order to reach destination").

In some embodiments, the tidal effect may be calculated with an isochronal approach. In some embodiments, the tidal effect may be calculated with an isodistance approach. FIG. 5C illustrates the calculation visually. As illustrated the watercraft 100 starts at a current location 516. The watercraft is able to travel a first motor distance 531a from the current location 516. The first motor distance 531a corresponds to the distance the watercraft may move in still or calm water (e.g., the miles per gallon) or the engine effect on the distance traveled. While traveling the first motor distance 531a, the tide had a first tide effect 532a on the watercraft 100. The sum of the first motor distance 531a and the first tide effect 532a is a first distance traveled 530a. Thus, the watercraft 100 travels from the current location to a first location 516a in a first interval. The calculation may be repeated with a second motor distance 531b, and a second tide effect 532b, to yield a second distance traveled 530b between the first point 516a and a second point 516b in a second interval.

In some embodiments, the intervals (e.g., first and second intervals) may be time based, or distance based (e.g., isochronal or isodistance). For example, if the user determines the travel time will be 3 hours, the system may perform 6 interval calculations to determine a tidal estimated available travel distance 530 the watercraft 100 may travel from the current location 516a, based on the engine effect 531 and effects of the tides 532. Similarly, the system may determine the distance associated with the engine effect 531 over the specified time period, and perform the interval calculations, for example, every 5 miles.

In some embodiments, the system may perform an initial calculation, and may update the tidal boundary area after a triggering event. As discussed above, the triggering event may be the passage of time, change in the tides, change in fuel efficiency, change in weather conditions, change in location, change in a no-go zone, or other events which may influence the estimated available travel distance. In some embodiments, the system may update after a predetermined amount of time, for example, 30 seconds, 1 minute, or 5 minutes.

In some embodiments, the triggering event may be changing tidal stations. In some embodiments, the watercraft 100 may travel within the body of water covered by different tidal stations. In some embodiments, the tidal boundary area 447 may be automatically updated upon entry into a new tidal station area.

In some embodiments, the triggering event may be a weather pattern. In some embodiments, the tide effects may change, due to a storm or other weather pattern, thus the system may receive updated tidal effects and update the tidal boundary area 447 accordingly.

In some embodiments, the tidal effect 532 may be calculated based on the current location of the watercraft 100 or starting location of the calculation, while in other embodiments the tidal effect 532 may be calculated based on the tidal effect at the end location. In some embodiments, the tidal effect 532 may be averaged over the distance traveled based on the engine effect 531. The system may perform the calculation again, wherein the end point becomes the start point.

This method may be repeated for a variety of directions from the current location of the watercraft to obtain the tidal effect boundary area 447 (see e.g., FIG. 5A).

In some embodiments, the system may be configured to use one or all of the discussed factors, (e.g., geographic conditions, natural variables, and/or return trips) at the same time. FIG. 6 illustrates an example chart 603 illustrating a boundary area 607 determined based on an estimated available travel distance 660, in comparison with an updated boundary area 657. As illustrated the updated boundary area 657 factors in a tidal effect 648, a determined end point 614, and accounts for geographical no-go areas including land masses 602. Thus, the system may provide the overall boundary area 657 as an indication of where the watercraft may travel while having enough energy to end at the determined end point.

It should be understood the term "boundary area" includes, at least, for example, boundary area 207, boundary area 207', boundary area 207a, updated boundary area 207b, boundary area 307, return boundary area 327, changing boundary area 337, updated changing boundary area 337', boundary area 407, tidal boundary area 447, second tidal boundary area 447a, third tidal boundary area 447b, boundary area 607, and updated boundary area 657.

Example System Architecture

FIG. 7 illustrates a block diagram of an example system 700 according to various embodiments of the present invention described herein. The illustrated system 700 includes a marine electronic device 790. The system 700 may comprise numerous marine devices. As shown in FIG. 7, one or more sonar transducer assemblies 762 may be provided. A radar 756, a rudder 757, a propulsion system 785 including a primary motor 705, a trolling motor 710, and an energy level sensor 795, and additional sensors/devices 760 may also be provided as marine devices, but other marine devices may be provided as well. One or more marine devices may be implemented on the marine electronic device 790. For example, a position sensor 745, a direction sensor 748, an autopilot 750, and other sensors 752 may be provided within the marine electronic device 790. These marine devices can be integrated within the marine electronic device 790, integrated on a watercraft at another location and connected to the marine electronic device 790, and/or the marine devices may be implemented at a remote device 754 in some embodiments. The system 700 may include any number of different systems, modules, or components; each of which may comprise any device or means embodied in either hardware, software, or a combination of hardware and software configured to perform one or more corresponding functions described herein.

The marine electronic device 790 may include at least one processor 710, a memory 720, a communication interface 730, a user interface 735, a display 740 (e.g., display 200, 300, 400, 600), autopilot 750, and one or more sensors (e.g. position sensor 745, direction sensor 748, other sensors 752). One or more of the components of the marine electronic device 790 may be located within a housing or could be separated into multiple different housings (e.g., be remotely located).

The processor(s) 710 may be any means configured to execute various programmed operations or instructions stored in a memory device (e.g., memory 720) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 710 as described herein. For example, the at least one processor 710 may be configured to analyze various data.

In some embodiments, the at least one processor 710 may be further configured to implement signal processing. In some embodiments, the at least one processor 710 may be configured to perform enhancement features to improve the display characteristics of data or images, collect or process additional data, such as time, temperature, GPS information, waypoint designations, or others, or may filter extraneous data to better analyze the collected data. The at least one processor 710 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 720 may include one or more non-transitory storage or memory devices such as, for example, volatile and/or non-volatile memory that may be either fixed or removable. The memory 720 may be configured to store instructions, computer program code, sonar data, and additional data such as radar data, chart data, location/position data in a non-transitory computer readable medium for use, such as by the at least one processor 710 for enabling the marine electronic device 790 to carry out various functions in accordance with example embodiments of the present invention. For example, the memory 720 could be configured to buffer input data for processing by the at least one processor 710. Additionally or alternatively, the memory 720 could be configured to store instructions for execution by the at least one processor 710.

The communication interface 730 may be configured to enable communication to external systems (e.g. an external network 792). In this manner, the marine electronic device 790 may retrieve stored data from a remote device 754 via the external network 792 in addition to or as an alternative to the onboard memory 720. Additionally or alternatively, the marine electronic device 790 may transmit or receive data, such as sonar signal data, sonar return data, sonar image data, or the like to or from a sonar transducer assembly 762. In some embodiments, the marine electronic device 705 may also be configured to communicate with other devices or systems (such as through the external network 792 or through other communication networks, such as described herein). For example, the marine electronic device 790 may communicate with a propulsion system 785 of the watercraft 100 (e.g., for autopilot control); a remote device (e.g., a user's mobile device, a handheld remote, etc.); or another system. Using the external network 792, the marine electronic device may communicate with and send and receive data with external sources such as a cloud, server, etc. The marine electronic device may send and receive various types of data. For example, the system may receive weather data, tidal data, chart data, alert data, among others. However, this data is not required to be communicated using external network 792, and the data may instead be communicated using other approaches, such as through a physical or wireless connection via the communications interface 730.

The communications interface 730 of the marine electronic device 790 may also include one or more communications modules configured to communicate with one another in any of a number of different manners including, for example, via a network. In this regard, the communications interface 730 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 700.

The position sensor 745 may be configured to determine the current position and/or location of the marine electronic device 790 (and/or the watercraft 100). For example, the position sensor 745 may comprise a GPS, bottom contour, inertial navigation system, such as machined electromagnetic sensor (MEMS), a ring laser gyroscope, or other location detection system. Alternatively or in addition to determining the location of the marine electronic device 790 or the watercraft 100, the position sensor 745 may also be configured to determine the position and/or orientation of an object outside of the watercraft 100.

The display 740 (e.g. one or more screens) may be configured to present images and may include or otherwise be in communication with a user interface 735 configured to receive input from a user. The display 740 may be, for example, a conventional LCD (liquid crystal display), a touch screen display, mobile device, or any other suitable display known in the art upon which images may be displayed.

In some embodiments, the display 740 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 762 or from sonar devices positioned at other locations, such as remote from the watercraft. Additional data may be received from marine devices such as a radar 756, a primary motor 705 or an associated sensor, a trolling motor 710 or an associated sensor, and energy level sensor 795, an autopilot, a rudder 757 or an associated sensor, a position sensor 745, a direction sensor 748, other sensors 352, a remote device 754, onboard memory 720 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 735 may include, for example, a keyboard, keypad, function keys, mouse, scrolling device, input/output ports, touch screen, or any other mechanism by which a user may interface with the system.

Although the display 740 of FIG. 7 is shown as being directly connected to the at least one processor 710 and within the marine electronic device 790, the display 740 could alternatively be remote from the at least one processor 710 and/or marine electronic device 790. Likewise, in some embodiments, the position sensor 745 and/or user interface 735 could be remote from the marine electronic device 790.

The marine electronic device 790 may include one or more other sensors/devices 752, such as configured to measure or sense various other conditions. The other sensors/devices 752 may include, for example, an air temperature sensor, a water temperature sensor, a current sensor, a light sensor, a wind sensor, a speed sensor, or the like.

The sonar transducer assemblies 762 illustrated in FIG. 7 may include one or more sonar transducer elements 767, such as may be arranged to operate alone or in one or more transducer arrays. In some embodiments, additional separate sonar transducer elements (arranged to operate alone, in an array, or otherwise) may be included. As indicated herein, the sonar transducer assemblies 762 may also include a sonar signal processor or other processor (although not shown) configured to perform various sonar processing. In some embodiments, the processor (e.g., at least one processor 710 in the marine electronic device 790, a controller (or processor portion) in the sonar transducer assemblies 762, or a remote controller—or combinations thereof) may be configured to filter sonar return data and/or selectively control transducer element(s) 767. For example, various processing devices (e.g., a multiplexer, a spectrum analyzer, A-to-D converter, etc.) may be utilized in controlling or filtering sonar return data and/or transmission of sonar signals from the transducer element(s) 767.

The sonar transducer assemblies 762 may also include one or more other systems, such as various sensor(s) 766. For example, the sonar transducer assembly 762 may include an orientation sensor, such as gyroscope or other orientation sensor (e.g., accelerometer, MEMS, etc.) that can be configured to determine the relative orientation of the sonar transducer assembly 762 and/or the one or more sonar transducer element(s)— such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 7 may be rearranged to alter the connections between components. For example, in some embodiments, a marine device outside of the marine electronic device 790, such as the radar 756, may be directly connected to the at least one processor 710 rather than being connected to the communication interface 730. Additionally, sensors and devices implemented within the marine electronic device 790 may be directly connected to the communications interface in some embodiments rather than being directly connected to the at least one processor 710.

Example Flowchart(s) and Operations

Some embodiments of the present invention provide methods, apparatus, and computer program products related to the presentation of information according to various embodiments described herein. Various examples of the operations performed in accordance with embodiments of the present invention will now be provided with reference to FIGS. 8-9. FIGS. 8-9 present a flowchart with example method(s) of determination of a boundary area and corresponding calculation thereof. These methods may be performed by a wide variety of components, including, but not limited to, one or more processors, one or more microprocessors, and one or more controllers. In some embodiments, a marine electronic device 790 (FIG. 7) may comprise one or more processors that perform the functions shown in FIGS. 8-9. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a remote server, remote device, etc.

FIG. 8-9 illustrate flowcharts according to example methods of determining a boundary area according to various example embodiments. The operations illustrated in and described with respect to FIGS. 8-9 may, for example, by performed by, with the assistance of, and/or, under the control of one or more of the processor 710, memory 720, communication interface 730, user interface 735, position sensor 745, direction sensor 748, other sensor 752, autopilot 750, transducer assembly 762, display 740, radar 756, rudder 757, propulsion system 785, primary motor 705, trolling motor 710, additional sensors 760, and/or external network 792/remote device 754.

FIG. 8, illustrates an example method 800. The method 800 may include causing presentation of a chart, including representation of a watercraft at a current location at operation 810. The method 800 may continue by determining an amount of energy remaining within a propulsion system of the watercraft at operation 820. The method 800 may continue by calculating an estimated available travel distance associated with the amount of energy remaining at operation 830. The method 800 may continue by determining tidal data at operation 840. The method 800 may continue by determining a boundary area from the estimated available travel distance and the tidal data at operation 850. The method 800 may continue by causing presentation of the boundary area on the chart at operation 860.

FIG. 9 illustrates an example method 900. The method 900 may include causing presentation of a chart, including representation of a watercraft at a current location at operation 910. The method 900 may continue by determining an amount of energy remaining within a propulsion system of the watercraft at operation 920. The method 900 may continue by calculating an estimated available travel distance associated with the amount of energy remaining at operation 930. The method 900 may continue by receiving an indication of an end point at operation 940. The method 900 may continue by determining a boundary area from the estimated available travel distance and the indicated end point at operation 950. The method 900 may continue by causing presentation of the boundary area on the chart at operation 960.

FIGS. 8-9 illustrates a flowchart of a system, method, and computer program product according to various example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 720 and executed by, for example, the processor 710. As will be appreciated, any such computer program product may be loaded onto a computer or other programmable apparatus (for example, a marine electronic device 790) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 790) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and That which is claimed:

1. A system for indicating a navigable area that is reachable on a current amount of energy for a watercraft, the system comprising:
a display;
a processor; and
a memory including a computer code configured to, when executed by the processor, cause the system to:
receive position data indicating a current geographic location of the watercraft on a body of water;
receive an indication of an end point different from the current geographic location of the watercraft;
determine tidal data for the current geographic location of the watercraft indicating an effect of the tide on the watercraft;
determine, based on energy remaining data corresponding to at least one of an amount of fuel or an amount of charge remaining, an estimated available travel distance for operating a motor of the watercraft before the watercraft runs out of energy;
generate an overlay for a chart, wherein the overlay comprises a boundary area on the chart, wherein the boundary area corresponds to the estimated available travel distance and the effect of the tide on the watercraft; and
present the overlay on the chart to visually communicate the boundary area to indicate travel options for the watercraft from the current geographic location;
wherein the estimated available travel distance is further based on the watercraft reaching the end point such that the watercraft can reach any point within the boundary area and still have enough energy to return to the end point, and
wherein the overlay indicates the travel options of the watercraft from the current geographic location to other locations while still being able to travel to the end point.

2. The system of claim 1, wherein the determined tidal data is based on tidal data from a tidal station corresponding to the current geographic location or a future potential geographic location of the watercraft.

3. The system of claim 1, wherein the estimated available travel distance is further based on at least one current weather condition.

4. The system of claim 1, wherein the computer code, when executed by the processor, is further configured to cause the system to:
generate an audible signal corresponding to a change in the boundary area over a determined threshold.

5. A system for indicating a navigable area that is reachable on a current amount of energy, the system comprising:
a display;
a processor; and
a memory including a computer program code configured to, when executed by the processor, cause the system to:
receive position data indicating a current geographic location of a watercraft on a body of water;
determine, based on energy remaining data corresponding to at least one of an amount of fuel or an amount of charge remaining, an estimated available travel distance for operating a motor of the watercraft before the watercraft runs out of energy;
receive an indication of an end point different from the current geographic location of the watercraft;
generate an overlay for a chart, wherein the overlay comprises a boundary area on the chart, wherein the boundary area corresponds to the current geographic location, the end point, and the estimated available travel distance;
present the overlay on the chart to visually communicate the boundary area to indicate travel options for the watercraft from the current geographic location to other locations while still being able to travel to the end point.

6. The system of claim 1, wherein the computer code, when executed by the processor, is further configured to cause the system to:
generate a suggested route within the boundary area to maximize energy efficiency of the watercraft between the current location of the watercraft and an end point.

7. The system of claim 1, wherein the computer code, when executed by the processor, is further configured to cause the system to:
determine an optimum speed to maximize energy efficiency of the watercraft between the current location of the watercraft and an end point.

8. The system of claim 1, wherein the computer code, when executed by the processor, is further configured to cause the system to:
receive cartographic data;
wherein the boundary area is further based on the cartographic data.

9. The system of claim 1, wherein the computer code, when executed by the processor, is further configured to cause the system to:
receive tidal data for the current geographic location of the watercraft at a plurality of future times;
determine a future plurality of points corresponding to the maximum distance the watercraft can travel in the plurality of directions based on the amount of fuel or the amount of charge remaining and the effect of the tide on the watercraft at the plurality of future times;
generate a plurality of overlays for the chart, wherein the plurality of overlays correspond to alternative boundary areas, wherein the alternative boundary areas correspond to the estimated available travel distance the watercraft can travel in each of the plurality of directions at each of the plurality of future times; and
present a selected overlay comprising one of the plurality of overlays for the chart, wherein the selected overlay corresponds to a user selected time from the plurality of future times.

10. The system of claim 1, wherein the estimated available travel distance is further based on an isochronal calculation of the effect of the tides.

11. The system of claim 1, wherein the estimated available travel distance is further based on an isodistance calculation of the effects of the tides.

12. The system of claim 1, wherein the tidal data includes tidal data at one or more future times.

13. A marine electronics device comprising:
- a position sensor configured to determine a current geographic location of a watercraft associated with the marine electronics device;
- a display;
- a processor;
- a memory including a computer program code configured to, when executed by the processor, cause the system to:
  - receive the current geographic location of the watercraft on a body of water;
  - receive an indication of an end point different from the current geographic location of the watercraft;
  - determine tidal data for the current geographic location of the watercraft indicating an effect of the tide on the watercraft;
  - determine, based on energy remaining data corresponding to at least one of an amount of fuel or an amount of charge remaining, an estimated available travel distance for operating a motor of a watercraft before the watercraft runs out of energy;
  - generate an overlay for a chart, wherein the overlay comprises a boundary area on the chart, wherein the boundary area corresponds to the estimated available travel distance and the effect of the tide on the watercraft; and
  - present the overlay on the chart to visually communicate the boundary area to indicate travel options for the watercraft from the current geographic location;
  - wherein the estimated available travel distance is further based on the watercraft reaching the end point such that the watercraft can reach any point within the boundary area and still have enough energy to return to the end point, and
  - wherein the overlay indicates the travel options of the watercraft from the current geographic location to other locations while still being able to travel to the end point.

14. A method of generating a boundary area for a watercraft on a body of water, the method comprising:
- determining a current location of the watercraft;
- receive an indication of an end point different from the current geographic location of the watercraft;
- determining an amount of energy remaining for operating the watercraft;
- determining tidal data based on the current location of the watercraft;
- calculating an estimated available travel distance in a plurality of directions from the current location of the watercraft based on the amount of energy remaining;
- generating a boundary estimation by connecting the plurality of points;
- receiving tidal data for the body of water within the boundary estimation;
- determining a tide effect on the watercraft based on the tidal data; and
- generating the boundary area based on the boundary estimation and the effect of the tide on the watercraft within the boundary estimation;
- wherein the estimated available travel distance is further based on the watercraft reaching the end point such that the watercraft can reach any point within the boundary area and still have enough energy to return to the end point, and
- wherein the boundary area indicates the travel options of the watercraft from the current geographic location to other locations while still being able to travel to the end point.

15. The method of claim 14, further comprising:
receiving cartographic data of the body of water; and
determining unnavigable areas based on the cartographic data, and
wherein generating the boundary area is further based on the unnavigable areas.

16. The system of claim 5, wherein the computer code, when executed by the processor, is further configured to cause the system to:
- receive chart data, wherein the chart data defines unnavigable areas;
- wherein the boundary area is further calculated by:
  - determining a plurality of points corresponding to the estimated available travel distance in a plurality of directions from the current geographic location of the watercraft, based on the unnavigable areas; and
  - connecting the estimated the plurality of points.

17. The system of claim 5, wherein the amount of energy remaining is a reduced amount of energy, wherein the reduced amount of energy is less than an actual amount of energy remaining.

18. The system of claim 5, wherein the estimated available travel distance is calculated based on an average energy consumption of the watercraft.

19. The system of claim 5, wherein the estimated available travel distance is calculated based on travel characteristics of the watercraft.

* * * * *